(12) United States Patent
Yamamoto et al.

(10) Patent No.: US 6,196,633 B1
(45) Date of Patent: Mar. 6, 2001

(54) RETRACTOR FOR A SEAT BELT

(75) Inventors: Kazuo Yamamoto; Masanao Fukunaga, both of Kanagawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/201,870

(22) Filed: Nov. 30, 1998

(30) Foreign Application Priority Data

Feb. 24, 1998 (JP) .................................................. 10-042015

(51) Int. Cl.[7] .................................................. B60R 22/34
(52) U.S. Cl. .......................... 297/474; 297/475; 297/480
(58) Field of Search .................................. 297/475, 476, 297/478, 480; 242/384.4

(56) References Cited

U.S. PATENT DOCUMENTS

| | | |
|---|---|---|
| 5,388,780 | 2/1995 | Matsuki . |
| 5,495,994 | 3/1996 | Rumpf et al. . |
| 5,660,444 * | 8/1997 | Thomas ............................ 297/478 X |
| 5,716,102 | 2/1998 | Ray et al. . |
| 5,882,084 * | 3/1999 | Verellen et al. ..................... 297/478 |

* cited by examiner

Primary Examiner—Anthony D. Barfield
(74) Attorney, Agent, or Firm—Evenson, McKeown, Edwards & Lenahan, P.L.L.C.

(57) ABSTRACT

A retractor 100 for a seat belt to be mounted within a seat back of a reclining type seat. The retractor 100 comprises a winding shaft 4 for winding a webbing 90 therearound, a lock element of an emergency lock mechanism 300 for locking the rotation of the winding shaft 4 in the webbing drawn-out direction thereof, and a vehicle body acceleration sensor 32 for detecting a given vehicle body acceleration to thereby actuate the lock element. The lock element of the emergency lock mechanism 300 is structured such that, while the seat belt is not in use, if the seat back is set within the range from the most forwardly inclined position of the seat back to the the most backwardly inclined position of the seat back, a locking wall 41c of a rotation control disk 41 is contactable with a securing piece 15d of an engaging member 15 to thereby prevent the engaging member 15 from moving in a direction where it can be engaged with a latch cup 13.

22 Claims, 23 Drawing Sheets

RETRACTOR FOR A SEAT BELT

BACKGROUND OF THE INVENTION

The present invention relates to a retractor for a seatbelt and, in particular, to an improved retractor for a seat belt which is mounted in the interior portion of a seat back of a seat of a reclining type for use in a vehicle or the like.

Conventionally, a retractor of a seat belt device for holding an occupant of a vehicle in a seat of the vehicle in safety is well known. The retractor is a device which, when a seat belt is not in use, pulls in a webbing automatically and also, when the seat belt is in use, allows the webbing to vary freely in length.

Recently, for example, Japanese Patent Unexamined Publication No. Hei. 8-80807 and the like teaches a seat belt device comprising a retractor of the above-mentioned type in which the retractor is mounted in the interior portion of a seat back of a reclining type seat in a vehicle or the like. In addition, the seat belt device further comprises a vehicle body acceleration sensor which can be operated even when the seat back (a support of the back of the seat) is inclined at any different positions.

Referring in particular to the conventional seat belt device 70, as shown in FIG. 25, one end of a webbing 90 is held by a seat-built-in type retractor 80 disposed in the upper portion of a seat back 73 of a seat 71 of a reclining type in such a manner that it can be taken up and drawn out, whereas the other end of the webbing 90 is supported by an anchor plate 74 fixed to a vehicle body or to a seat base portion.

In addition, a through tongue 75 disposed in the middle portion of the webbing between the retractor 80 and anchor plate 74 is engaged with a buckle 76 erected almost in the central portion of the vehicle body, thereby being able to hold an occupant in the seat 71 of a reclining type.

The seat back 73 of the seat 71, which is supported by a reclining device 78 so as to be inclinable back and forth with respect to the back-and-forth slidable seat sitting portion 72, s adjusted to inclined positions which vary in angles according to the physiques of occupants. On the other hand, in the structure of the vehicle body acceleration sensor of the retractor 80, for example, such acceleration sensor is supported so as to be pivotable about a rotation axis extending in parallel to the adjusting axis D of the seat back 73. Accordingly, the vehicle body acceleration sensor can be operated even when the seat back 73 is adjusted in the angle and is thus held at different inclined positions.

However, there are still left some problems which should be solved in the above-mentioned conventional seat belt device 70. In the seat belt device 70, one end portion of the webbing 90 is disposed on the swing end side 73a of the seat back 73 of the reclining type, but the other end portion 73b is supported by the anchor plate 74 fixed to the vehicle body or seat base portion. Due to this structure, if the seat back 73 is inclined back and forth, the webbing 90 can be taken up or drawn out with respect to the retractor 80.

In the seat-built-in type retractor 80 which incorporates therein at least the vehicle body acceleration sensor, if the seat back is inclined further beyond the allowable angle of the vehicle body acceleration sensor, there is possibly actuated an emergency lock mechanism which prevents the webbing 90 from being drawn out.

Thus, in the above seat belt device 70, as shown by imaginary lines FIG. 25, when the seat back 73 is inclined forwardly, the webbing 90, the other end portion of which is fixed to the vehicle body or seat sitting portion, is wound into the retractor 80. Moreover, if the seat back 73 is inclined forwardly further beyond the allowable angle of the vehicle body acceleration sensor, then the emergency lock mechanism is actuated to thereby prevent the webbing 90 from being drawn out.

And, even if the occupant tries to raise the seat back 73 again, because the emergency lock mechanism is in operation at the position where most of the webbing 90 is wound into the retractor 80, it becomes impossible to draw out the webbing 90 from the retractor 80. That is, there is a possibility that the webbing 90 is subjected to the tension and then the seat back 73 can not be raised.

In addition to this, when the seat 71 is slid forward from the state shown in FIG. 25, the anchor plate 74, as shown by imaginary lines in FIG. 25, is moved to a position behind the seat sitting portion 72. In this case, there is a possibility that, if the seat back 73 is inclined backwardly, then the emergency lock mechanism is actuated, so that, similarly to the above case, the seat back 73 cannot be raised.

SUMMARY OF THE INVENTION

The present invention aims at eliminating the drawbacks found in the above-mentioned conventional seat belt device.

Accordingly, it is an object of the invention to provide a retractor for a seat belt which is mounted in the interior portion of a seat back of a reclining type seat and also which allows the seat back to be raised, even if the seat back is inclined beyond the allowable angle of a vehicle body acceleration sensor under a state that the seat belt is stored in the retractor.

In attaining the above object, according to the invention, there is provided a retractor for a seat belt for use in a seat back of a reclining seat, the retractor comprising:

a retractor base;

a winding shaft rotatably supported on the retractor base for winding a webbing thereon;

a lock element interposed between the winding shaft and the retractor base for locking the rotation of the winding shaft in a webbing drawn-out direction thereof;

a vehicle body acceleration sensor for detecting a predetermined vehicle body acceleration to thereby actuate the lock element; and a restrict mechanism for preventing the lock element from actuating in accordance with an inclined angle of the seat back when a predetermined length of the seat belt is wound on the winding shaft while the seat belt is not use.

Further above-mentioned object can be attained by a retractor for a seat belt for use in a seat back of a reclining seat, the retractor comprising:

a retractor base;

a winding shaft rotatably supported on the retractor base for winding a webbing thereon;

a lock element interposed between the winding shaft and the retractor base for locking the rotation of the winding shaft in a webbing drawn-out direction thereof;

a vehicle body acceleration sensor movably disposed on the retractor base for detecting a given vehicle body acceleration to thereby actuate the lock element, the vehicle body acceleration sensor including a sensor case and an inertia body, the inertia body being capable of taking a first position when the acceleration sensor is set in a predetermined state and a second position when the acceleration sensor is shifted from the predetermined state;

transmission mechanism interposed between the seat back and the vehicle body acceleration sensor for linking the movement of the sensor case with the movement of the seat back in accordance with the inclination angle of the seat back in order to be able to set the vehicle body acceleration sensor at the predetermined state regardless of the inclined state of the seat back; and a restrict mechanism for preventing the lock element from actuating in accordance with an inclination angle of the seat back when a predetermined length of the seat belt is wound on the winding shaft while the seat belt is not use.

In the above-mentioned retractor for a seat belt, preferably, the predetermined length of the webbing wound on the winding shaft is in the range from a first length given when the seat back is inclined at the most forwardly inclined position while the seat belt is not use and a second length given when the seat back is inclined at the most backwardly inclined position thereof while the seat belt is not use.

In the above-mentioned retractor for a seat belt, preferably, the predetermined length of the webbing wound on the winding shaft is in the range from the shortest length and the longest length, the shortest length of the webbing wound on the winding shaft is occurred when the seat back is inclined between the most forwardly inclined position and the most backwardly inclined position and the reclining seat is moved between the most forward position and the most rearward position while the seat belt is not use, and the longest length of the webbing wound on the winding shaft is occurred when the seat back is inclined between the most forwardly inclined position and the most backwardly inclined position and the reclining seat is moved between the most forward position and the most rearward position while the seat belt is not use.

According to the above structure, in the range from the most forwardly inclined position of the seat back to the most forwardly inclined position of the seat back, the restrict mechanism prevents the lock element from operating. Therefore, even if the seat back is inclined beyond the operation allowable angle of the vehicle body acceleration sensor when the seat belt is stored, there is no possibility that the webbing cannot be drawn out from the retractor.

By the way, preferably, the restrict mechanism can detect the winding amount of the webbing wound into the retractor, in such a manner that the restrict mechanism is allowed to operate in accordance with the detected webbing winding amount. That is, if the detected webbing winding amount is present between the webbing winding amount (the first given amount) given when the seat back is inclined most forwardly while the seat belt is not use and the webbing winding amount (the second given amount) given when the seat back is inclined most backwardly while the seat belt is not use, then the restrict mechanism can operate or prevent the operation of the lock element.

Also, preferably, the lock element may comprise: a ratchet wheel which is normally able to rotate following the winding shaft; a latch member which, when it is rotated together with the winding shaft in the webbing drawn-out direction, can bring the winding shaft into engagement with the retractor base to thereby lock the rotation of the winding shaft in the webbing drawn-out direction; and, a engagement lock element which, when the ratchet wheel is delayed in rotation with respect to the winding shaft, moves the engaging member in a direction where it can be engaged with the latch member to thereby connect the latch member to the winding shaft.

And, the vehicle body acceleration sensor may comprise: a sensor arm which is disposed in such a manner that it can be set in a first position where it can be engaged with the ratchet wheel and in a second position where it cannot be engaged with the ratchet wheel; a sensor case which can be rotatably supported on the retractor base; and, an inertia body which, on receiving an acceleration variation of a given level or higher, is able to move relatively on and with respect to the sensor case to thereby move the sensor arm to the above-mentioned first position.

Further preferably, the lock element may comprise: a ratchet wheel which is normally able to rotate following the winding shaft; a latch member which, when it is rotated together with the winding shaft in the webbing drawn-out direction, can bring the winding shaft into engagement with the retractor base to thereby lock the rotation of the winding shaft in the webbing drawn-out direction; and, a engagement lock element which, when the ratchet wheel is delayed in rotation with respect to the winding shaft, moves the engaging member in a direction where it can be engaged with the latch member to thereby connect the latch member to the winding shaft.

And, the vehicle body acceleration sensor may comprise: a sensor arm which is rotatably mounted on the retractor base or sensor case in such a manner that it can be set in a first position where it can be engaged with the ratchet wheel and in a second position where it cannot be engaged with the ratchet wheel; an inertia body which, on receiving an acceleration of a given level or higher, is able to move relatively on and with respect to the inertia body support surface of the sensor case to thereby move the sensor arm to the above-mentioned first position; and, a transmission mechanism which links the movement of the sensor case with the inclining motion of the seat back according to the inclination angle of the seat back so that the direction of the inertia body support surface can be maintained properly regardless of the inclined state of the seat back, whereby the lock element can be actuated by means of the moving operation of the inertia body when a given acceleration is applied thereto.

Also, preferably, the transmission member of the transmission mechanism can be wound around a winding member which is disposed concentrically with the adjusting axis of the seat back, and the sensor case can be rotated according to the inclining motion of the seat back by an amount corresponding to the winding amount of the transmission member wound around the winding member. Also, preferably, the transmission mechanism may include a cam plate having a cam surface extending in the peripheral direction thereof with the adjusting axis of the seat back as the center thereof, and a transmission member movable following the cam surface of the cam plate to thereby link the motion of the sensor case with the inclining motion of the seat back.

DETAILED DESCRIPTION OF THE PREFERRED EMBODIMENTS

Now, detailed description will be given with several embodiments of a retractor for a seat belt according to the invention, with reference to the accompanying drawings.

Figure 25:
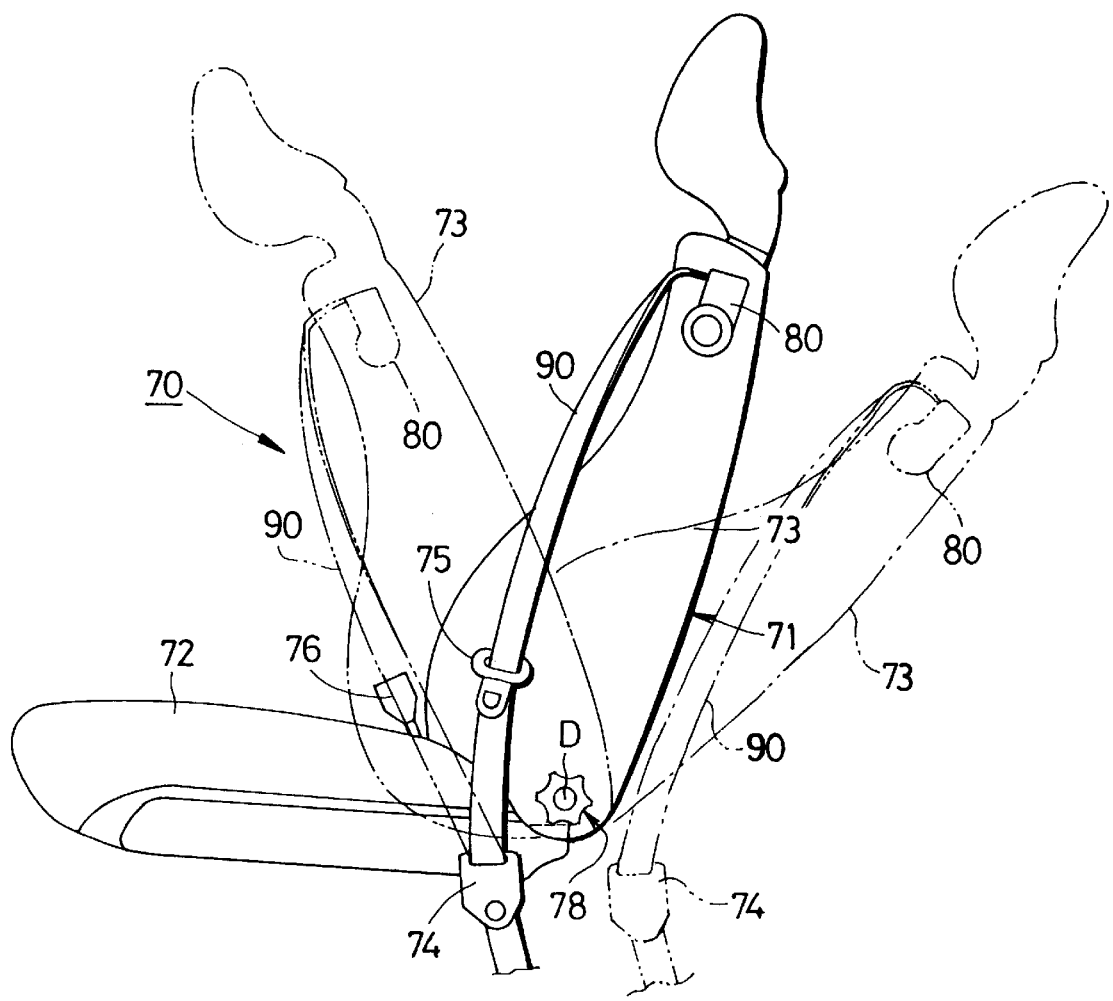
FIG. 25 is a schematic side view of a conventional seat belt device.

In a first embodiment of the present invention, a retractor 100 for a seat belt is mounted on a reclining type seat. The retractor 100 incorporates therein a vehicle body acceleration sensor 32 for a seat belt which can be operated even when a seat back (a support of the back of the seat, see FIG. 25 "73") is inclined at different positions.

Figure 1:
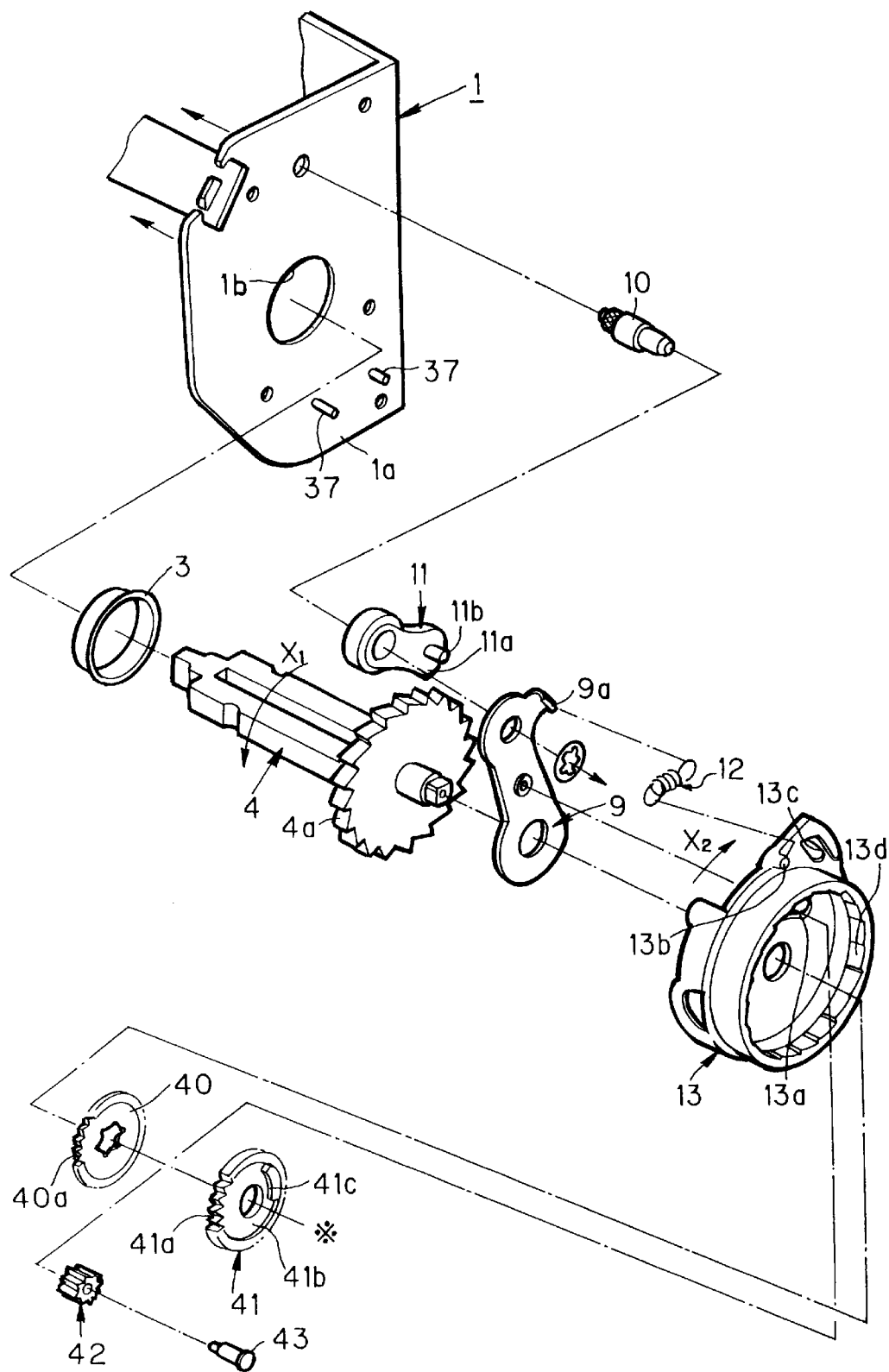
FIG. 1 is an exploded perspective view of a portion of a retractor for a seat belt according to a first embodiment of the invention.
Figure 2:
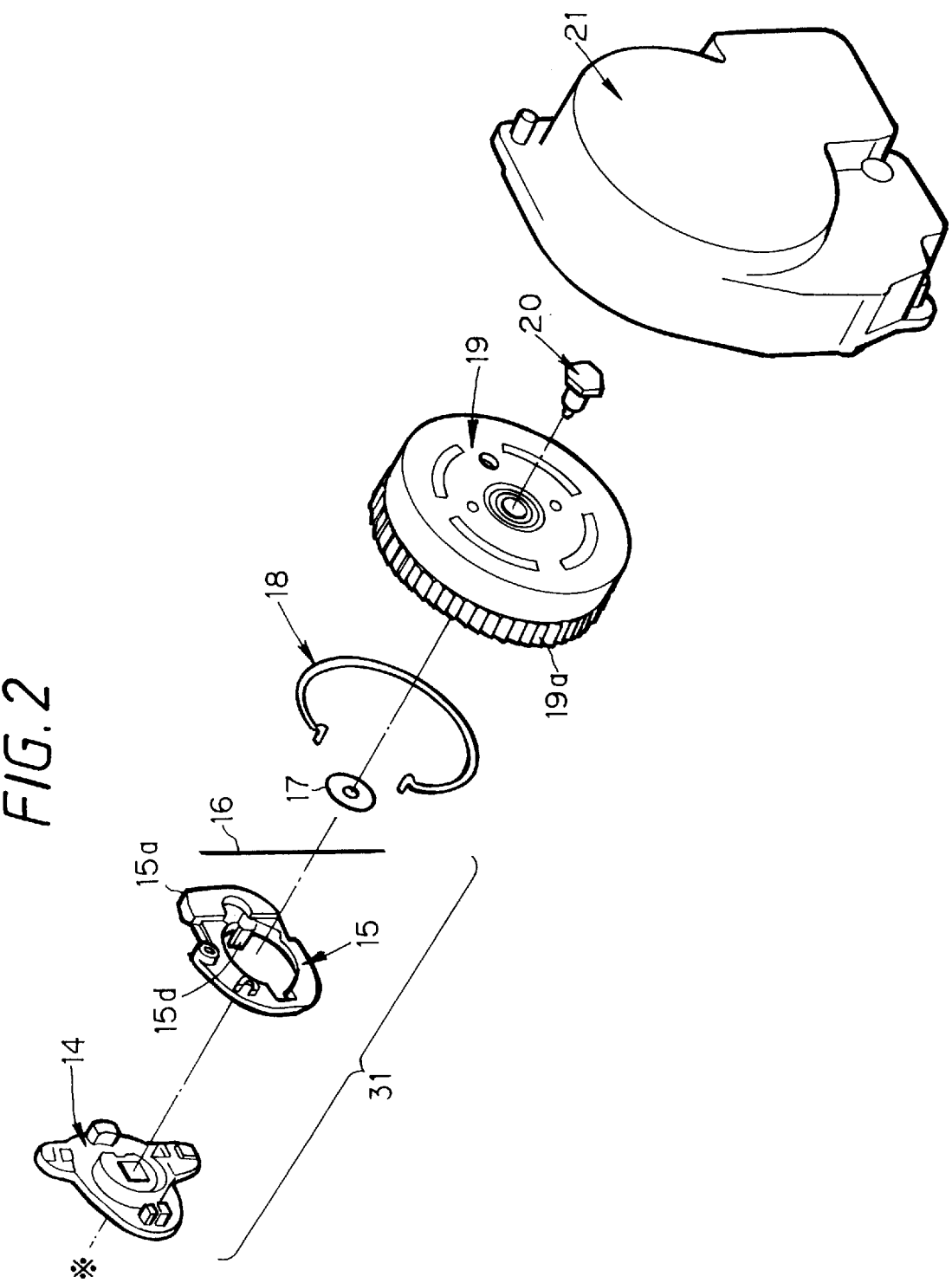
FIG. 2 is an exploded perspective view of the remaining portions of the retractor for a seat belt shown in FIG. 1.
Figure 3:
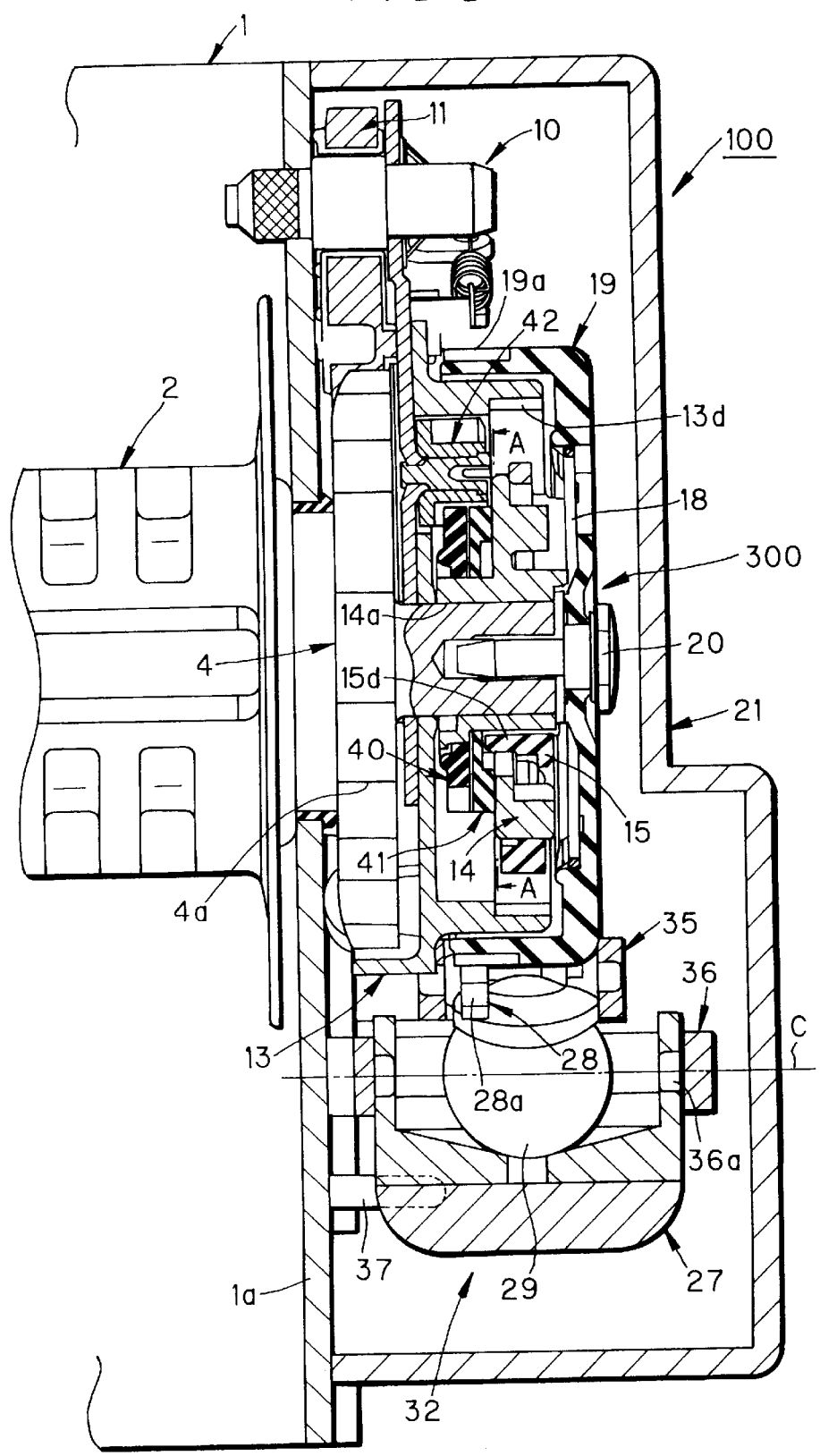
FIG. 3 is a section view of the main portions of the retractor for a seat belt shown in FIGS. 1 and 2.

Referring here to the exploded perspective view and partial section views of the retractor 100 for a seat belt shown in FIGS. 1 to 3, a retractor base 1, to be fixed to a frame member (not shown) of the seat back, basically has a U-shaped cross section. The retractor base 1 includes a pair of mutually opposed side plates 1a in which there are opened up through holes 1b in such a manner that they are opposed to each other. A winding shaft 4 is provided on the two through holes 1b through left and right plastic bushes 3 so as to bridge over the two through holes 1b, while a bobbin 2 on which a webbing can be wound is fixedly mounted on the winding shaft 4. In one end portion of the winding shaft 4, there is disposed a known spring device (not shown) which normally energizes the winding shaft 4 in a direction where the webbing is taken up.

On the other end portion of the winding shaft 4, there is disposed an emergency lock mechanism 300 which, in an emergency, is used to prevent the webbing from being drawn out. In the present invention, as a concrete structure for the emergency lock mechanism 300 which, in an emergency, prevents the webbing from being drawn out, there can be employed various known structures. For example, in the first embodiment of the invention, the emergency lock mechanism 300 comprises a ratchet wheel 19, a latch cup 13 and an engagement lock element 31. The ratchet wheel 19 can be rotated following the rotation of the winding shaft 4. The latch cup 13 serves as a latch member which can be rotated together with the winding shaft 4 to thereby bring a latch plate 4a of the winding shaft 4 into engagement with a pawl 11 so as to lock the rotation of the winding shaft 4 in the webbing drawn-out direction. The engagement lock element 31, when the rotation of the ratchet wheel 19 is delayed with respect to the rotation of the winding shaft 4, moves an engaging member 15 in a direction where it can be engaged with the latch cup 13 so as to connect the latch cup 13 to the winding shaft 4. The pawl 11 is pivotably rotated and supported on a pawl pin 10 which is fitted into a through hole on the side plate 1a.

A flange 14 and an engaging member 15 are secured through a drive side gear 40 and a rotation control disk 41 to the portion of the winding shaft that is outside the latch cup 13 in the axial direction. The engaging member 15 includes an engaging portion 15a to be engaged with the internal teeth 13d of the latch cup 13. The engagement lock element is defined by the flange 14 cooperateing with a sensor spring 16 and the engaging member 15.

On the outside portion of the engaging member 15, there is disposed the ratchet wheel 19 which is loosely fitted with a tapping screw 20 threadedly engaged with the flange 14 through a plain washer 17. On the outer peripheral surface of the ratchet wheel 19, there are formed a plurality of teeth 19a which are directed in the belt drawn-out direction and are to be engaged with a sensor arm 28 provided in a vehicle body acceleration sensor 32 (which will be discussed later). Further, the ratchet wheel 19, which is engaged with the engaging member 15 through a friction spring 18, can be rotated integrally with the winding shaft 4 as well as can be shifted in position with respect to the winding shaft 4.

The drive side gear 40 can be fitted with the leading end of the boss portion 14a of the flange 14 and thus can be rotated integrally with the winding shaft 4. The rotation control disk 41 can be fitted loosely and rotatably with the boss portion 14 of the flange 14 in such a manner that the disk 41 is superimposed on the drive side gear 40. The rotation control disk 41 includes, on its outer periphery, teeth 41a which have the same pitch diameter as the teeth 40a of the drive side gear 40 but are different in number, whereas, on the side surface of the rotation control disk 41, there is formed a circular-shaped recessed portion 41b. An intermediate gear 42 is disposed adjacently to the rotation control disk 41 and drive side gear 40 in such a manner that it can be meshed with the two sets of teeth 40a and 41a at the same time. Further, the intermediate gear 42 is rotatably supported by a pin 43 which is inserted through the latch cup 13 and is fixed to a tension plate 9. By the way, in the bottom portion of the latch cup 13, there is formed an elongated hole 13a which is used to prevent interference with the intermediate gear 42 when the latch cup 13 is rotated.

For example, the number of teeth of the drive side gear 40 is set to be 25, and the number of teeth of the rotation control disk 41 is set to be 24 or 26. tamely, number of teeth of the rotation control disk 41 is made smaller or larger than that of the drive side gear 40 by 1. In the drawings of the present embodiment, the teeth number of the rotation control disk 41 being 24 is drawn. The rotation control disk 41, which is driven by the drive side gear 40 through the intermediate gear 42, rotates following the drive side gear 40 in such a manner that it shifts in chase with respect to the drive side gear 40 by an amount corresponding to one tooth (in particular, 360 deg./24 teeth 15 deg.) each time the drive side gear 40 rotates once. By the way, it is easy to form a gear which has the same pitch diameter but is increased or decreased by one tooth in the teeth number according to a backlash setting method or the like.

Further, in a portion of the peripheral wall of the recessed portion 41b of the rotation control disk 41, there is formed a locking wall 41c which projects inwardly toward the rotation axis of the disk 41. And, on the engaging member 15, there is projectingly provided a securing piece 15d which can be inserted through a through opening 14b formed in the flange 14 and can be engaged with the present locking wall 41c. That is, the locking wall 41c and securing piece 15d cooperate together in forming a restrict mechanism which prevents the engaging member 15 from moving in a direction where it can be engaged with the internal teeth 13d of the latch cup 13 to delay the rotation of the ratchet wheel 19 with respect to the rotation of the winding shaft 4, to thereby restrict the engagement of the pawl 11 with the latch plate 4a of the winding shaft 4.

Figure 4:
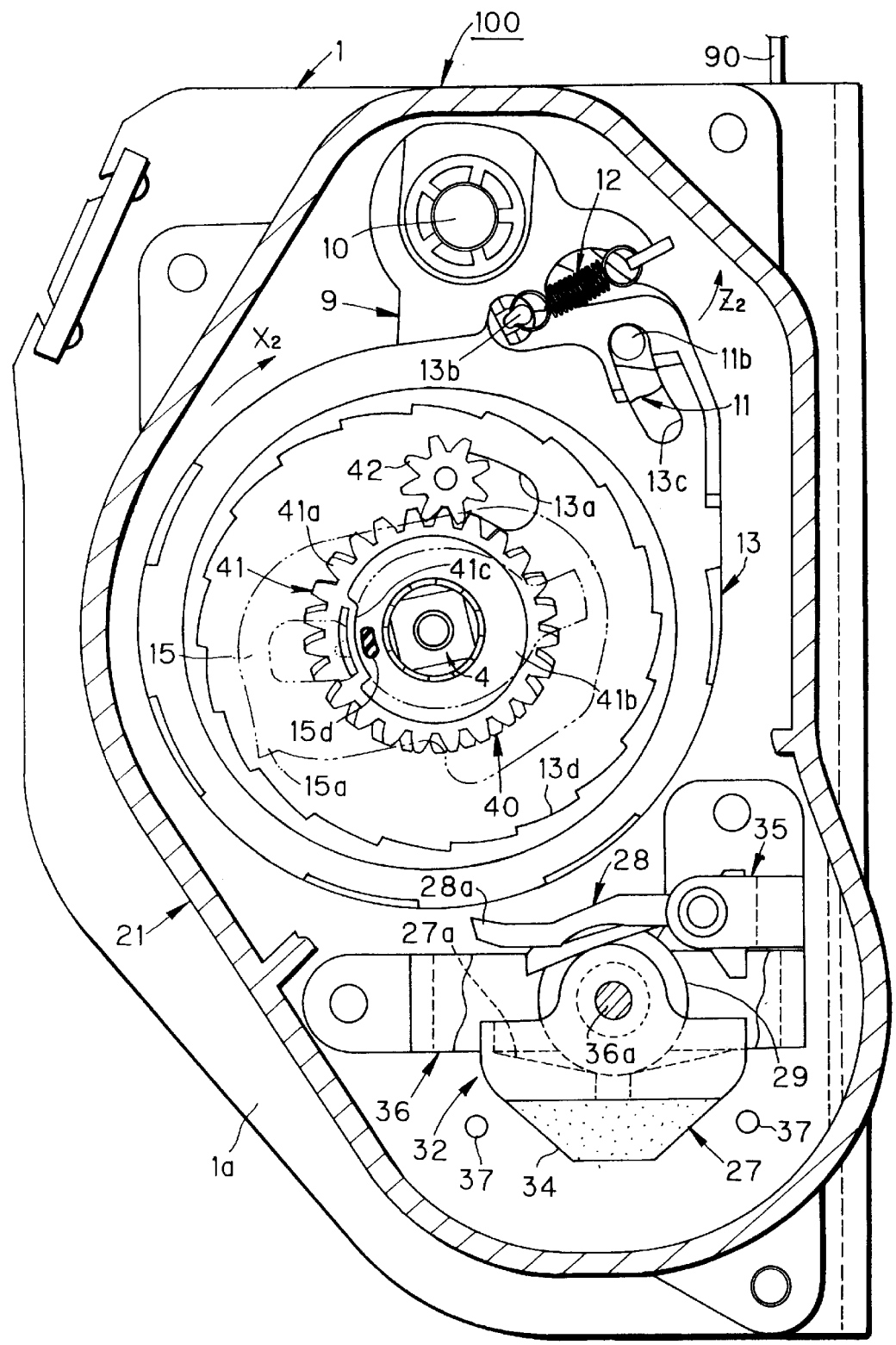
FIG. 4 is a section view of the main portions of the retractor for a seat belt, taken along the arrow line A—A in FIG. 3 for explanation of the locking operation to lock the drawn-out motion of a webbing.

The rotation control disk 41, the rotation speed of which is reduced with respect to the rotation of the winding shaft 4, detects a webbing winding amount (a first given amount) being obtained when the seat back is inclined most forwardly while the seat belt is not in use, and also a webbing winding amount (a second driven amount) being obtained when the seat back is inclined most backwardly while the seat belt is not in use. As shown in FIG. 4, the rotation control disk 41 and engaging member 15 are assembled together, in such a manner that the locking wall 41c and securing piece 15d are disposed opposed to each other when the winding amount of the webbing taken up into the retractor is present between the first and second given amounts.

In this construction, when the engaging portion 15a of the engaging member 15 tends to move in a direction where it can be engaged with the internal teeth 13d of the latch cup 13, this movement of the engaging member 15 is restricted by contacting the securing piece 15d with the locking wall 41c, to thereby prevent the engaging member 15 from being engaged with the latch cup 13.

Also, downwardly of the ratchet wheel 19, there is disposed a sensor case 27 in such a manner as to be freely rotatable with respect to the side plate la of the retractor base 1. The sensor case 27 cooperates with the sensor arm 28, which is engageable with the ratchet wheel 19, in forming the vehicle body acceleration sensor 32 for a seat belt. And, on the outside portion of the side plate la covering the emergency lock mechanism 300, there is disposed a sensor cover 21.

The vehicle body acceleration sensor 32, as shown in FIGS. 3 and 4, comprises the sensor arm 28 which is mounted on the side plate la so as to be movable between a first position where the sensor arm 28 can be engaged with the teeth 19a of the ratchet wheel 19 and a second position where it cannot be engaged with the teeth 19a. The vehicle body acceleration sensor 32 further comprises a ball weight 29 consisting of an inertia body which moves on the sensor case 27 with respect to the sensor case 27 when the ball weight 27 is subject to an acceleration variation of a predetermined level or higher, to thereby move the sensor arm 28 to the above-mentioned first position.

The sensor arm 28 is swingably supported on the retractor base 1 through a support member 35 and the position of the sensor arm 28 can be shifted in the range from a position (a position shown in FIG. 4) where it is not engaged with the teeth 19a of the ratchet wheel 19 to a position where it can be engaged with the teeth 19a. That is, the sensor arm 28 can be engaged with the teeth 19a of the ratchet wheel 19 to delay the rotation of the ratchet wheel 19 with respect to the rotation of the winding shaft 4, so that the sensor arm 28 can bring the pawl 11 into engagement with the latch plate 4a through the latch cup 13 to thereby prevent the winding shaft from rotating in the webbing drawn-out direction.

The sensor case 27 includes a conical-shaped recessed portion 27a serving as an inertia body support surface on which the ball weight 29 can be placed and, on the lower portion of the sensor case 27, there is mounted a weight 34. In addition, the sensor case 27 is journaled on a support shaft 36a for a pair of support arms 36 mounted on the cuter surface of the side plate 1a, while the sensor case 27 can be freely rotated with respect to the retractor base 1 about a rotation axis C extending in parallel to the adjusting axis of the seat back.

On receiving a vehicle body speed change of a given value or higher, the ball weight 29 moves on the conical-shaped recessed portion 27a of the sensor case 27 relatively to the conical-shaped recessed portion 27a to thereby move the sensor arm 28 to the first position.

Also, according to the first embodiment of the invention, the respective centers of gravity of the ball weight 29 and sensor case 27 are situated on the same vertical line. Further, the positional relationship between the sensor arm 28 and ratchet wheel 19 is kept unchanged even if the seat-back is inclined and the retractor 100 is thereby inclined.

That is, if the retractor base 1 is inclined as the seat back is inclined, then the sensor case 27 including the weight 34 is rotated in the gravity direction due to its own weight, so that the sensor case 27 is always kept at a constant ground angle (that is, in a given state). On the other hand, the ball weight 29 remains at its normal position where the ball weight 29 causes the sensor arm 28 to be set at the second position. At this time, since the rotation axis C of the sensor case 27 lies on the same axis as the center of gravity of the ball weight 29, the position of the center of gravity of the ball weight 29 remains unchanged, so that the relative position of the sensor arm 28 to the teeth 19a of the ratchet wheel 19 remains unchanged.

Also, on the side plate 1a that is located on the two swing end sides of the sensor case 27, there are projectingly provided a pair of stopper pins 37 and 37 which are used to limit the rotation range of the sensor case 27. That is, if the seat back is inclined further beyond a range in which the vehicle body acceleration sensor 32 functions normally when the occupant wears the seat belt, the rotation of the sensor case 27 is stopped by the stopper pins 37 and 37 to thereby relatively move the ball weight 29 with respect to the conical-shaped recessed portion 27a, so that the emergency lock mechanism 300 is actuated.

By the way, the term "lock element" used in the present invention means the emergency lock mechanism 300 with the vehicle body acceleration sensor 32 excluded therefrom.

Next, description will be given below of the operation of the above-mentioned retractor 100 for a seat belt.

Figure 6:
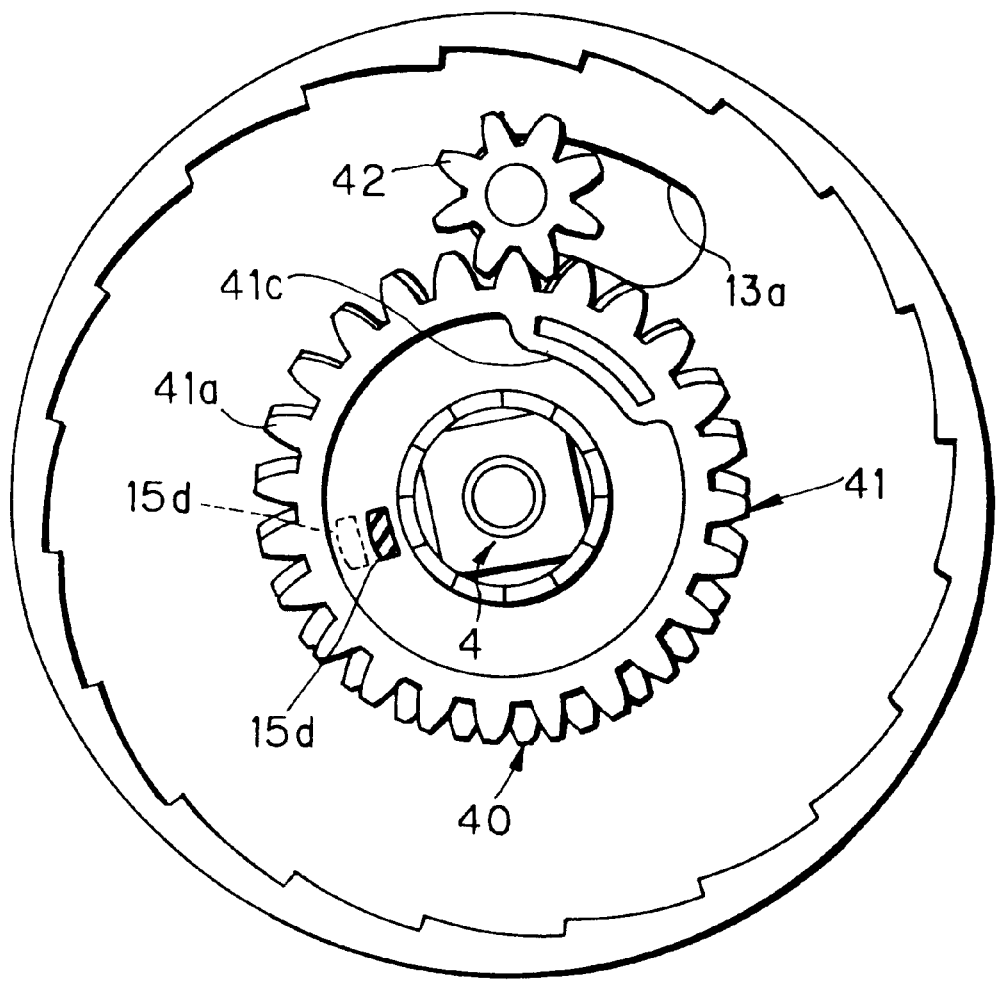
FIG. 6 is an enlarged view of the main portions of the retractor for a seat belt shown in FIGS. 1 and 2, explaining the operation of a rotation control disk shown in FIG. 4.

At first, in the normal use state thereof, as shown in FIG. 4, the latch cup 13 is energized in a webbing winding or take-up direction (in a direction of an arrow $X_2$ shown in FIG. 4) by the biasing force of a return spring 12 which is mounted on both of the spring hanger 13b of the latch cup 13 and the spring hanger 9a of the tension plate 9, the pawl 11 with its pawl guide projection 11b engaged with a pawl guide hole 13c formed in the latch cup 13 is energized in an arrow $Z_2$ direction where the pawl 11 cannot be engaged with the latch plate 4a, and the engaging portion 15a of the engaging member 15 is energized by the biasing force of the sensor spring 16 to a position where the engaging portion 15a cannot be meshed with the internal teeth 13d of the latch cup 13, so that a webbing 90 can be drawn out freely. Also, as shown in FIG. 4, the rotation control disk 41 and engaging member 15 are assembled together at a set position where the locking wall 41c and securing piece 15d are disposed opposed to each other in such a manner that, as described before, the rotation control disk 41 detects the webbing winding amount (the first given amount) obtained when the seat back is inclined most forwardly while the seat belt is not in use and the webbing winding amount (the second given amount) obtained when the seat back is inclined most backwardly while the seat belt is not in use; and, when the winding amount of the webbing taken up or wound into the retractor is present between the first and second given amounts. However, when the occupant wears/uses the seat belt and the webbing 90 is drawn out by a given amount from the retractor, the winding shaft 4 is thereby rotated in the webbing drawnout direction, and then, as shown in FIG. 6, the locking wall 41c of the rotation control disk 41 is moved to a position where it is not opposed to the securing piece 15d of the engaging member 15. In particular, the rotation control disk 41 is followingly rotated by the drive side gear 40 rotating together with the winding shaft 4 in such a manner that the disk 41 leads by an amount equivalent to one tooth each time it is rotated and, therefore, the rotation control disk 41 shifts in phase by an amount equivalent to one tooth each time the winding shaft 4 is rotated. That is, this is the reason why the locking wall 41c of the rotation control disk 41 is moved to a position where it is not opposed to the securing piece 15d of the engaging member 15. By the way, when the occupant wears/uses the seat belt, because the winding shaft 4 is normally rotated 8 to 10 times in the webbing drawn-out direction, the locking wall 41c can be situated at a position where it is completely unengageable with the securing piece 15d.

Accordingly, if the vehicle body acceleration sensor 32 for a seat belt receives a speed change of a given level or higher in a vehicle emergency such as a collision or the like, then the ball weight 29 is moved on the sensor case 27 relatively to the sensor case 27 due to inertia to thereby push up the sensor arm 28, so that the sensor arm 28 is situated at the first position and the leading end 28a of the sensor arm 28 is meshed with the teeth 19a of the ratchet wheel 19. As a result of this, the ratchet wheel 19 is prevented from rotating in the belt drawn-out direction.

Figure 5:
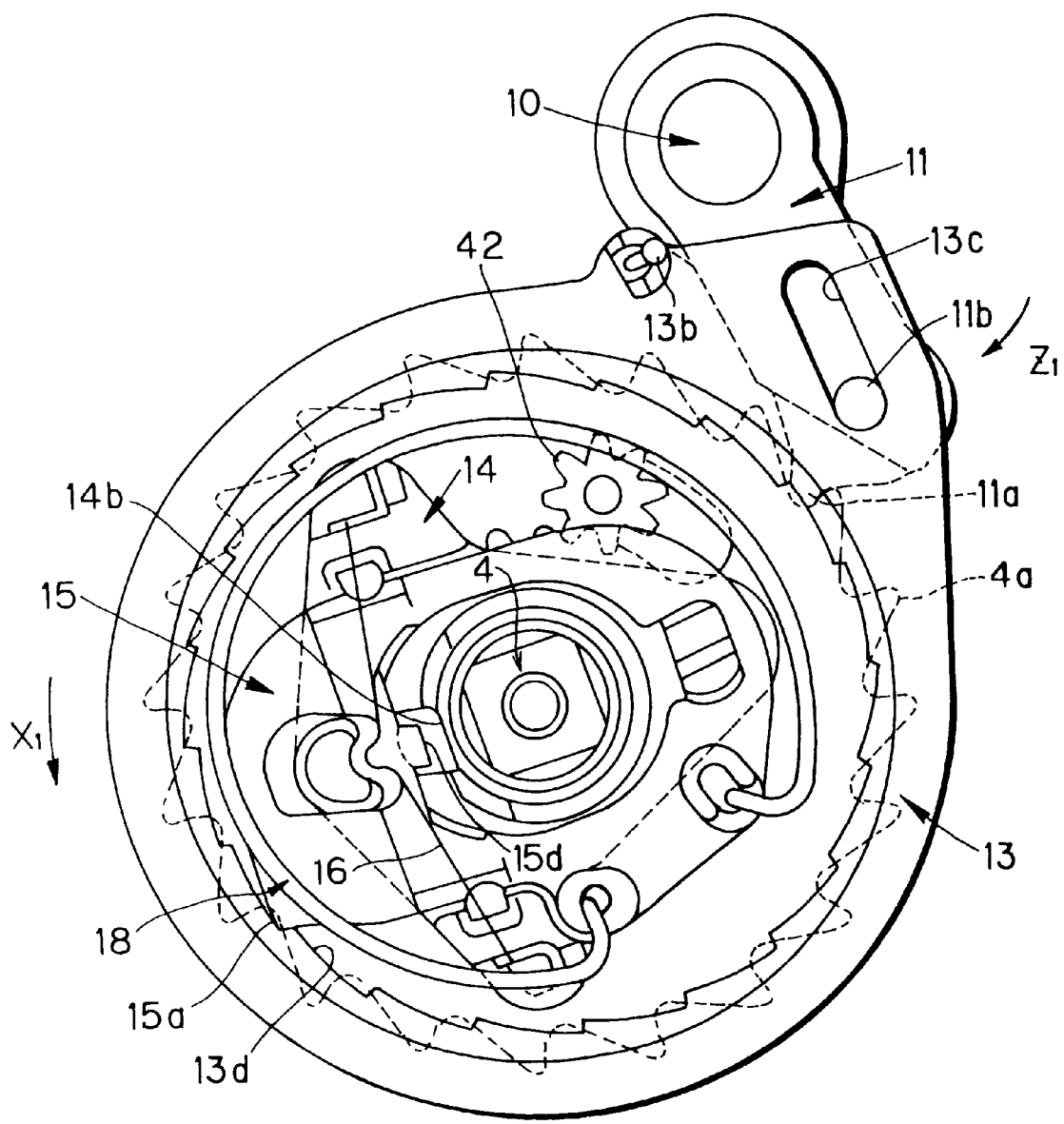
FIG. 5 is an enlarged view of the main portions of the retractor for a seat belt shown in FIGS. 1 and 2, explaining the webbing drawn-out locking operation.

In a state where the rotation of the ratchet wheel 19 is being prevented and the webbing 90 is drawn out further, the rotation of the ratchet wheel 19 is then delayed with respect to the rotation of the winding shaft 4 in the webbing drawn-out direction. Therefore, as shown in FIG. 5, the engaging portion 15a of the engaging member 15 is mesheded with the internal teeth 13d of the latch cup 13, so that the rotational force of the flange 14 rotates the latch cup 13 integrally with the winding shaft 4 in the arrow X direction against the biasing force of the return spring 12. Due to this, the latch cup 13 rotates the pawl 11 in the arrow $Z_1$ direction to thereby bring the engaging portion 11a of the pawl 11 into engagement with the latch plate 4a. As a result of this, the pawl 11 restricts the rotation of the latch plate 4a in the arrow $X_1$ direction, that is, the pawl 11 restricts the drawn-out operation of the webbing to thereby lock the same.

When a drawn-out force is applied to the webbing 90 in an emergency such as a collision or the like and thus the winding shaft 4 receives a sudden rotational force of a given level or higher in the webbing drawn-out direction (in the arrow $X_1$ direction), similarly, the rotation of the ratchet wheel 19 is delayed, by receiving an inertia force, with respect to the rotation of the winding shaft 4 in the webbing drawn-out direction, thereby actuating the engagement lock element 31. As a result of this, the drawn-out operation of the webbing 90 is locked in the same manner as described above.

And, if the drawn-out force applied to the webbing 90 is removed, then the latch cup 13 is rotated in the opposite direction to the arrow $X_1$ direction through the biasing force of the return spring 12 to thereby rotate the pawl 11 in the arrow $Z_2$ direction, which removes the locking of the latch plate 4a. As a result of this, the webbing 90 can be drawn out freely.

Further, if the winding shaft 4 is rotated in the webbing take-up direction from the webbing drawn-out state due to the spring force of the take-up spring device (not shown), then the rotation control disk 41 is followingly rotated by the drive side gear 40 rotating together with the winding shaft 4 in such a manner that the disk 41 leads by an amount equivalent to one tooth each time it is rotated. And, if the winding amount of the webbing 90 wound into the retractor reaches a value present between the above-mentioned first and second given amounts, then, as shown in FIG. 4, the locking wall 41c of the rotation control disk 41 is returned to the position where it is opposed to the securing piece 15d of the engaging member 15. Accordingly, when the seat belt is not in use (that is, when the occupant does not wear the seat belt) and the seat back is inclined beyond the range in which the vehicle body acceleration sensor 32 can function normally, the ball weight 29 is relatively moved with respect to the conical-shaped recessed portion 27a of the sensor case 27 the rotation range of which is limited by the stopper pin 37, so that the sensor arm 29 is moved to the first position. However, as described above, when the webbing winding amount is present between the first and second given amounts, the securing piece 15d is contacted with the locking wall 41c to thereby restrict the movement of the engaging member 15. And, in this state, if the webbing 90 is drawn out from the retractor, the rotation of the ratchet wheel 19 is delayed than the rotation of the winding shaft 4 in the webbing drawn-out direction. Due to this, even if the engaging portion 15a of the engaging member 15 is going to move in a direction where it can be engaged with the internal teeth 13d of the latch cup 13, the engaging member 15 cannot be engaged with the latch cup 13. For this reason, the rotation of the winding shaft 4 in the webbing drawn-out direction cannot be locked.

That is, when the rotation control disk 41 detects the winding amount of the webbing 90 to thereby know that the winding amount of the webbing 90 is present between the first and second given amounts, the locking wall 41c of the rotation control disk 41 is contacted with the securing piece 15d of the engaging member 15 to thereby restrict the movement of the engaging member 15 in the direction where it can be engaged with the latch cup 13. Thus, in the reclining type seat with the above-mentioned retractor 100 for a seat belt mounted thereon, if the seat back is inclined forwardly or backwardly under a state that the seat belt is stored, the webbing 90 with the other end thereof fixed to the vehicle body or seat base portion is wound into the retractor. On the other hand, even if the seat back is inclined at an angle larger than or equal to the allowed angle of the vehicle body acceleration sensor 32, the emergency lock mechanism 300 is not actuated, so that the webbing 90 can be drawn out from the retractor. Therefore, there is no possibility that the webbing 90 can be tensed too much to raise the seat back.

By the way, the invention is note limited to the restrict mechanism, vehicle body acceleration sensor, lock element and the like that are employed in the above-mentioned first embodiment of the invention but, of course, various changes are possible.

For example, it is also possible to employ a restrict mechanism which is structured in the following manner: that is, a drive side gear forming the restrict mechanism is formed on the base side of the flange 14 in such a manner as to be integral with the base side portion of the flange 14; a rotation control disk is rotatably and loosely fitted with the boss portion 14a of the flange 14 in such a manner that it is superimposed on the base side of the present drive side gear; an intermediate gear is rotatably journaled on the latch cup 13; and, a locking wall projectingly provided on the rotation control disk is contacted with the securing piece 15d of the engaging member 15, thereby being able to restrict the movement of the engaging member 15 in a direction where it can be engaged with the latch cup 13.

Also, the restrict mechanism for restricting the lock element of the emergency lock mechanism 300 is not limited to the structure employed in the above-mentioned embodiment in which the locking wall 41c of the rotation control disk 41 restricts the engaging, member 15 directly. For example, there may be employed a structure in which the drive side gear and rotation control disk cooperating together in forming the restrict mechanism are disposed outside the ratchet wheel 19 and, when the webbing winding amount reaches a value present between the first and second given amounts, the movement of the sensor arm 29 to the first position can be prevented directly by a lever member which can be driven by the rotation control disk.

Further, the mechanism for delaying the rotation of the rotation control disk with respect to the rotation of the winding shaft is not limited to the structure using the above-mentioned drive side gear 40 and intermediate gear 42 but other types of rotation speed reduction gear mechanism can also be used.

Now, FIGS. 7 to 11 respectively show a lock element of an emergency lock mechanism according to a second embodiment of the invention using a restrict mechanism and a engagement lock element 50 respectively having another structures. In the second embodiment, instead of the above-mentioned rotation control disk 41, flange 14 and engaging member 15, there are used a rotation control disk 45, a flange 47, a lever 48, and an engaging member 19. However, the remaining portions of the second embodiment are similar in structure to those of the previously described first embodiment, and the lock element of the second embodiment is similar to that of the first embodiment in the operation principle. Therefore, the duplicate description thereof is omitted here.

Figure 7:
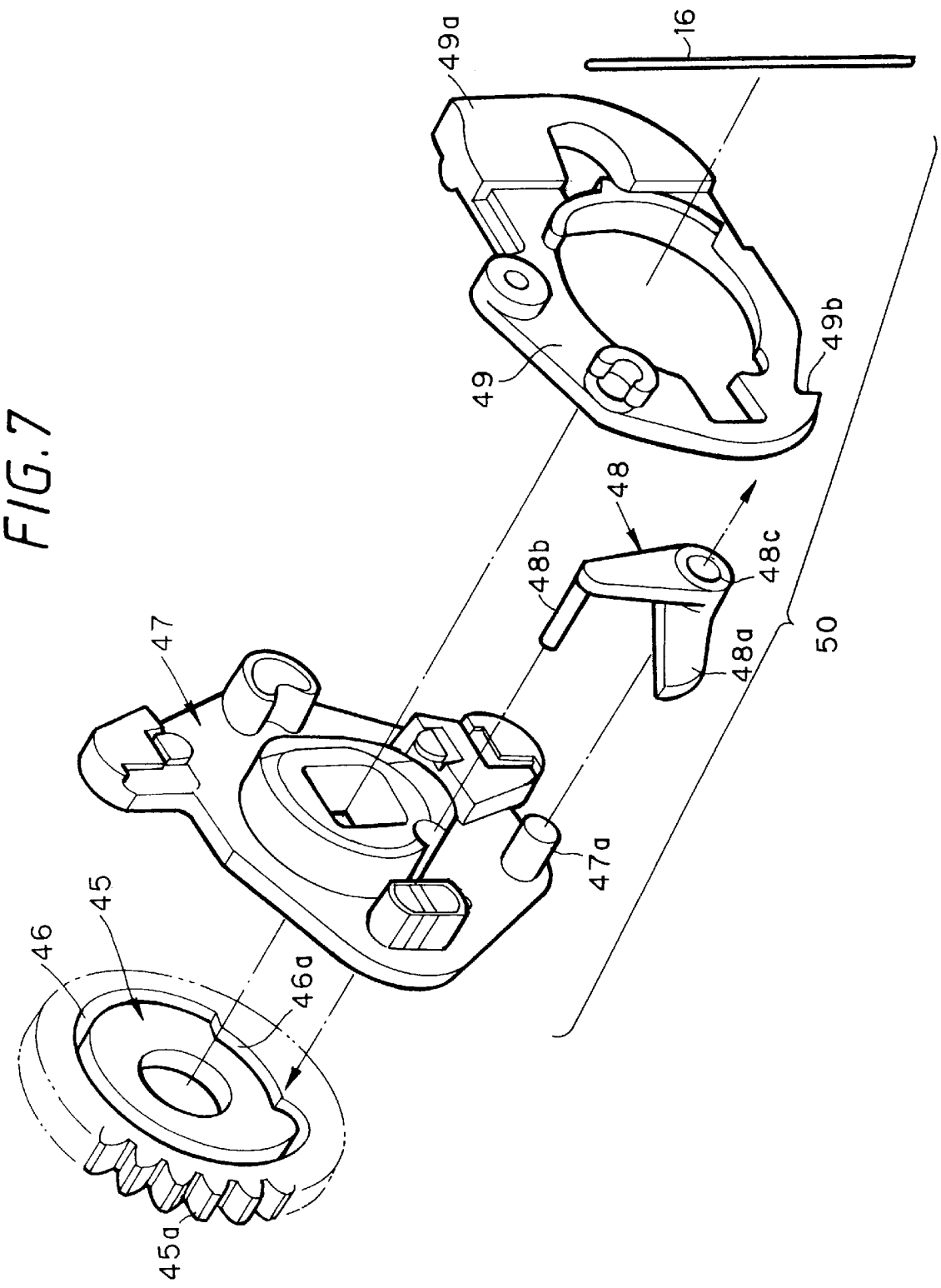
FIG. 7 is an exploded perspective view of a restrict mechanism and a engagement lock element employed in an emergency lock mechanism according to a second embodiment of the invention.

As shown in FIG. 7, the rotation control disk 45, which is disposed rotatably in such a manner as to be superimposed on the drive side gear 40, includes on the outer periphery thereof teeth 45a which have the same pitch diameter as the teeth 40a of the drive side gear 40 but are different in number from the teeth 40a. The rotation control disk 45, similarly to the rotation control disk 41 employed in the first embodiment, is arranged to rotate following the drive side gear 40 in such a manner that it shifts in phase with respect to the drive side gear 40 by an amount equivalent to one tooth each time the drive side gear 40 is rotated once.

Also, the rotation control disk 45 includes a cam groove 46 which is formed on the side surface thereof that is located opposed to the flange 47 and, in a portion of the cam groove 46, there is formed an inner cam groove area 46a which is bent in such a manner as to project inwardly toward the rotary shaft of the rotation control disk 45. In particular, the inner cam groove area 46a cooperates together with the lever 48 rotatably journaled on the pivot 47a of the flange 47 and a securing portion 49b formed in the engaging member 49 in constituting a restrict mechanism which prevents the engaging member 49 from moving in a direction where it can be engaged with the internal teeth 13d of the latch cup 13 to thereby restrict the movement of the lock element.

Figure 8:
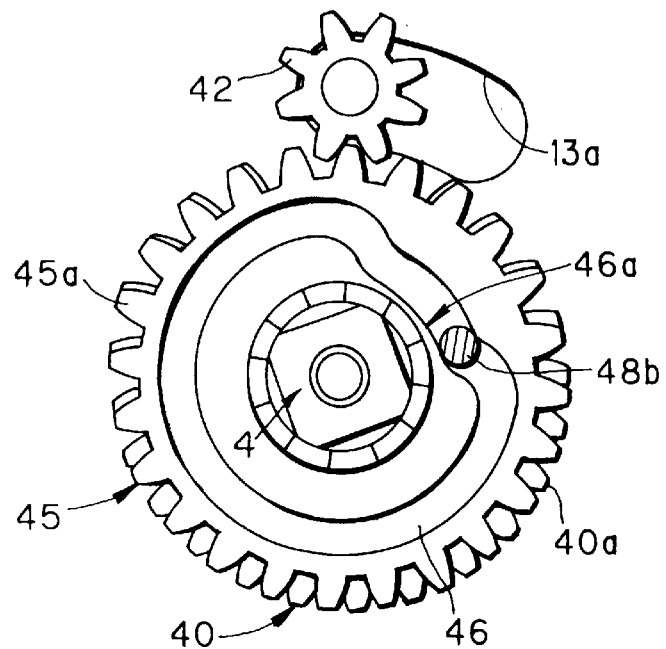
FIG. 8 is an enlarged view of the main portions of the second embodiment, explaining the operation of a rotation control disk shown in FIG. 7.
Figure 9:
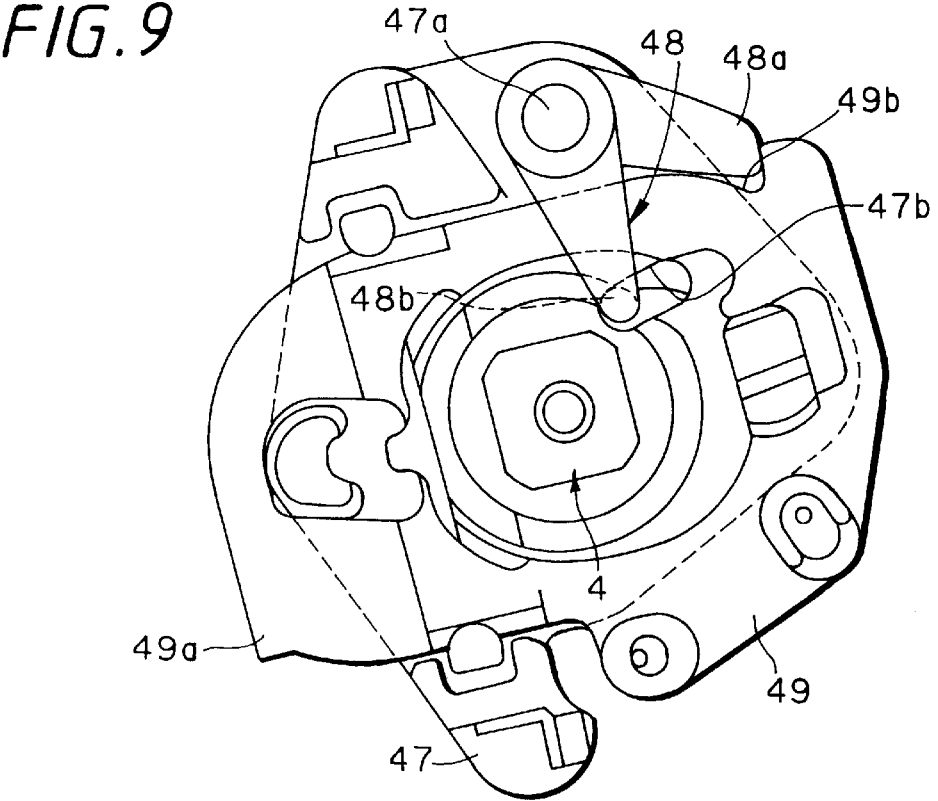
FIG. 9 is an enlarged view of the main portions of the second embodiment, explaining the operation of the engagement lock mechanism shown in FIG. 7.

The lever 48 comprises a securing arm 48a engageable with the securing portion 49b of the engaging member 49, and a driven projection portion 48b which extends through a through opening 47b formed in the flange 47 and can be engaged with the cam groove 46. And, he rotation control disk 45 detects a webbing winding amount (a first given amount) obtained when the seat back is inclined most forwardly and a webbing winding amount (a second given amount) obtained when the seat back is inclined most backwardly. When the winding amount of the webbing wound into the retractor is present between the first and second given amounts, as shown in FIGS. 8 and 9, the cam groove 46, lever 48 and engaging member 49 are assembled together at a set position in which the driven projection portion 48b of the lever 48 is situated in the inner cam groove area 46a and the securing arm 48a are engaged with the securing portion 49a. Therefore, even if the engaging portion 49a of the engaging member 49 is going to move in a direction where it can be engaged with the internal teeth 13d of the latch cup 13, because the securing portion 49b of the engaging member 49 is contacted with the securing arm 48a and the movement thereof is thereby restricted, the engaging member 49 cannot be engaged with the latch cup 13 so that the lock element is prevented against operation.

Figure 10:
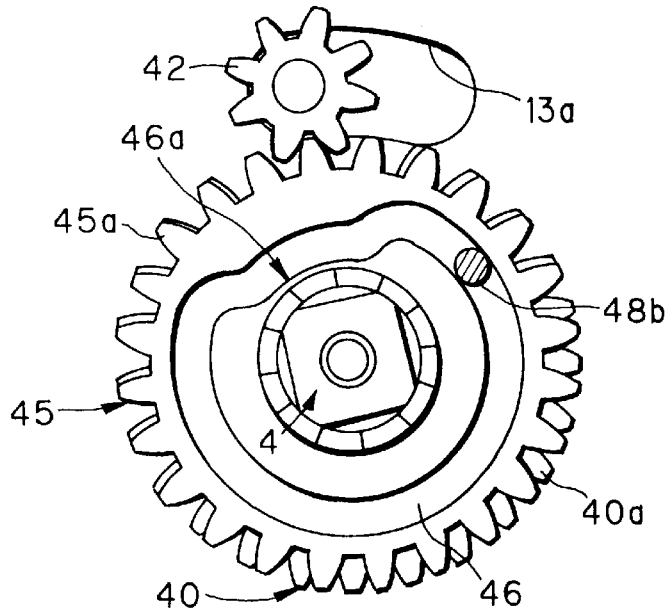
FIG. 10 is an enlarged view of the main portions of the second embodiment, explaining the operation of a rotation control disk shown in FIG. 7.
Figure 11:
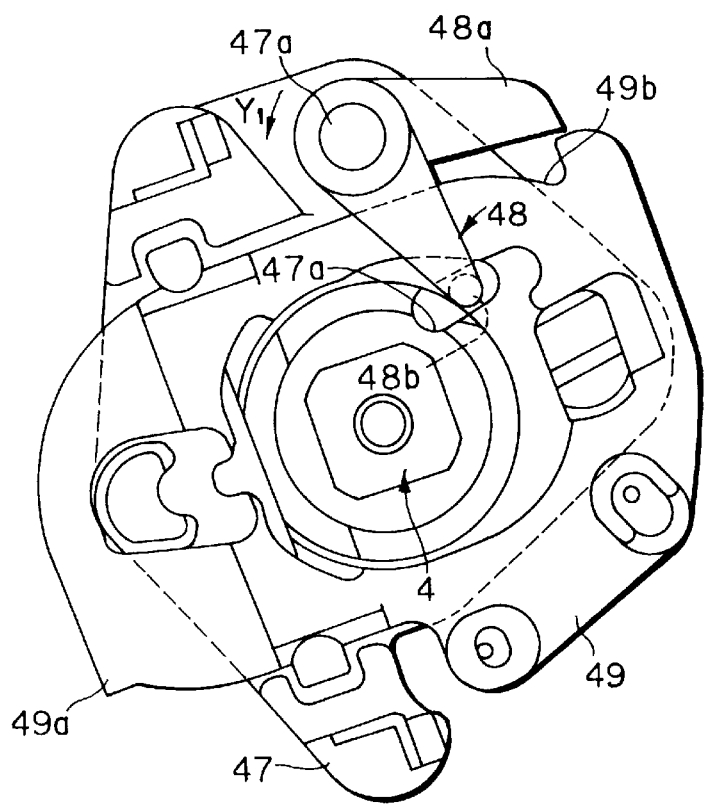
FIG. 11 is an enlarged view of the main portions of the second embodiment, explaining the operation of the engagement lock mechanism shown in FIG. 7.

When the occupant wears the seat belt, if the webbing is drawn out from the retractor by a given amount and the winding shaft 4 is thereby rotated in the webbing drawn-out direction, then, as shown in FIG. 10, the driven projection portion 48b of the lever 48 is caused to rotate following the rotation of the winding shaft 4 and thus move to the position of the cam groove 46 where the driven projection portion 48b is removed or shifted from the inner cam groove area 46a, with the result that, as shown in FIG. 11, the lever 48 is rotated in a direction of an arrow $Y_1$ shown in FIG. 11 and the securing arm 48a thereof is thereby moved to a position where it cannot be engaged with the securing portion 49b of the engaging member 49.

Accordingly, there is no possibility that the securing portion 49b can be contacted with the securing arm 48a and the movement of the engaging member 49 can be restricted; that is, the engaging portion 49a of the engaging member 49 is allowed to move in the direction where it can be engaged with the internal teeth 13d of the latch cup 13, so that the lock element can be actuated.

Also, if the winding shaft 4 is rotated from the webbing drawn-out state toward the webbing take-up direction due to the energizing force of a winding spring device (not shown), then the rotation control disk 45 is rotated by the drive side gear 40 following the drive side gear 40 in such a manner that it shifts in phase with respect to the drive side gear 40 by an amount equivalent to one tooth each time the drive side gear 40 is rotated one time; and, when the winding amount of the webbing 90 taken up into the retractor is present between the first and second given amounts, as shown in FIG. 8, the driven projection portion 48b is returned to the inner cam groove area 46a.

That is, the rotation control disk 45 detects the winding amount of the webbing 90 and, when it is found that the thus detected webbing 90 winding amount is present between the first and second given amounts, the securing portion 49b of the engaging member 49 is contacted with the securing arm 48a of the lever 48 to thereby restrict the movement of the engaging member 49 in such a manner that the engaging member 49 is kept from moving in the direction where it can be engaged with the latch cup 13. In other words, similarly to the previously described first embodiment, while the seat belt is stored, if the seat back is inclined forwardly or backwardly, the webbing 90, with the other end of which is fixed to the vehicle body or to the seat base portion, is taken up or wound into the retractor but, even if the seat back is inclined forwardly or backwardly at an angle greater than or equal to the allowed angle of the vehicle body acceleration sensor 32, the emergency lock mechanism is prevented against operation so that the webbing 90 can be drawn out from the retractor. Therefore, there is eliminated the possibility that the webbing 90 can be tensed too much to raise the seat back.

Figure 12:
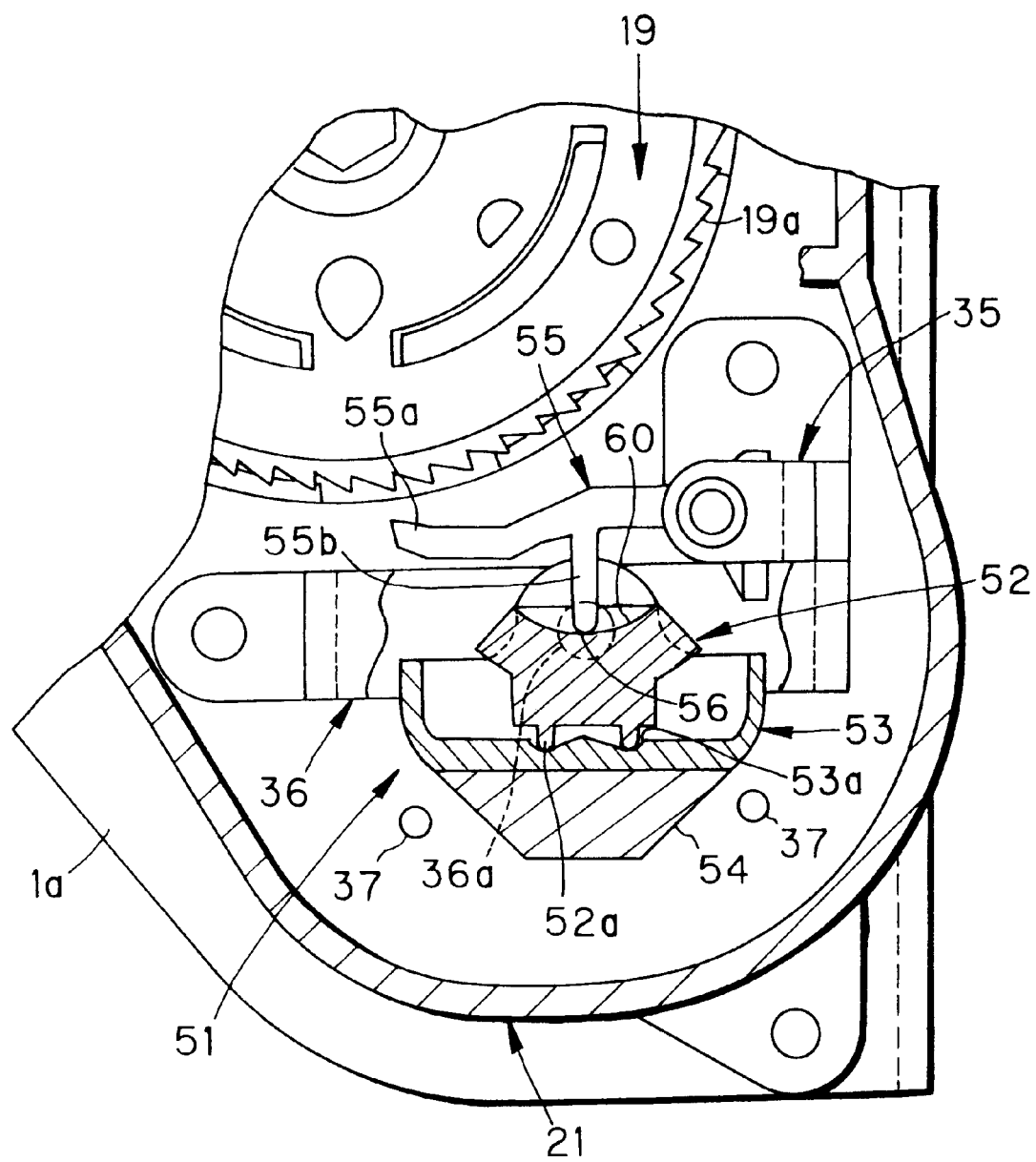
FIG. 12 is a section view of the main portions of a retractor for a seat belt including a vehicle body acceleration sensor for a seat belt according to a third embodiment of the inventor.

Also, in the above-mentioned respective embodiments, description has been given of the vehicle body acceleration sensor 32 using the ball weight 29 as an inertia body. However, the invention can further apply to a vehicle body acceleration sensor 51 for a seat belt using such a standing weight 52 as shown in FIG. 12. By the way, the vehicle body acceleration sensor 51 for a seat belt, which is employed in a third embodiment according to the invention, is similar in structure to the vehicle body acceleration sensors according to the previously described respective embodiments except that it uses a sensor case 53, a sensor arm 55 and a standing weight 52 instead of the sensor case 27, sensor arm 28 and ball weight 29. Also, the operation principle of a lock element employed in the third embodiment is similar to the lock elements employed in the previously described first and second embodiments and thus the description thereof is omitted here.

In particular, the vehicle body acceleration sensor 51 comprises the sensor arm 55 which is mounted on the side plate 1a of the retractor base 1 in such a manner that it can be set at a first position where it can be engaged with the teeth 19a of the ratchet wheel 19 and a second position where it cannot be engaged with the teeth 19a, and the standing weight 52 which, when it receives an acceleration variation of a given level or higher, it is inclined on the sensor case 53 to thereby move the sensor arm 55 to the above-mentioned first position.

The sensor case 53 includes an annular-shaped recessed portion 53a on which the standing weight 52 can be placed and, on the lower portion of the sensor case 53, there is mounted a weight 54. And, the sensor case 53 can be freely rotated with respect to the retractor base 1 about a rotation axis C which extends in parallel to the adjusting axis of the seat back.

Referring in particular to the structure of the standing weight 52, the standing weight 52 is formed in a substantially cylindrical shape; and, it includes a spherical-shaped recessed portion 60 formed on the upper surface thereof and also includes, on the lower surface thereof, a round-ring shaped leg portion 52a which corresponds to the annular-shaped recessed portion 53a of the sensor case 53.

On the other hand, the sensor arm 55 comprises an engaging portion 55a engageable with the teeth 19a of the ratchet wheel 19, a support shaft 55b which can be pivotally supported on the arm support member 35 mounted on the outer surface of the side plate 1a, and a projection portion 55c which can be contacted with the spherical-shaped recessed portion 60 of the standing weight 52.

Referring in more particular to the structure of the present vehicle body acceleration sensor 51, as shown in FIG. 12, a contact point 56 between the spherical-shaped leading end portion of the projection portion 55c and the spherical-shaped recessed portion 60 is positioned on the rotation axis C of the sensor case 53. Thanks to this, the sensor case 53 is able to rotate with respect to the retractor base 1 without causing the sensor arm 55 to vary in position. By the way, the standing weight 52 according to the present embodiment is structured such that the center of gravity thereof can also be coincident with the contact point 56 and thus can be positioned on the rotation axis C.

In the thus structured vehicle body acceleration sensor 51, if the retractor base 1 is inclined, then the sensor case 53 including the weight 54 is rotated in the gravity direction due to its own weight and is always kept at a given ground angle. And, the standing weight 52 remains situated at its normal position where the sensor arm 55 is set at the second position. On the other hand, if a vehicle body acceleration of a given level or higher is applied to the retractor for a seat belt due to the collision of the vehicle body or inclination thereof in a vehicle emergency, then the standing weight 52 and sensor case 53 are respectively going to move with respect to the remaining parts of the retractor due to their respective inertia. However, the sensor case 53, which is larger in mass than the standing weight 52, is actually difficult to move at the same speed together with the standing weight 52 when a sudden acceleration is applied to them. For this reason, on receiving an acceleration change of a given level or higher, the standing weight 52 is allowed to move faster than the sensor case 53.

Thus, on receiving an acceleration change of a given level or higher, the standing weight 52 is inclined about one edge portion of the leg portion 52a thereof to thereby push up the projection portion 55c of the sensor arm 55, so that the standing weight 52 can position the sensor arm 55 at the first position.

At the then time, since the standing weight 52 is structured such that the center of gravity thereof is substantially coincident with the contact point 56 and is situated on the rotation axis C, even if the sensor case 53 is moved, the standing weight 52 is left unchanged in position, which makes it possible to provide sensitivity similar to the sensitivity of a vehicle body acceleration sensor of a fixed type, that is, there is no fear that the sensitivity of the present vehicle body acceleration sensor 51 can be degraded.

Therefore, similarly to the vehicle body acceleration sensor 32 which has been employed in the previously described first and second embodiments, the vehicle body acceleration sensor 51 according to the third embodiment is also able to actuate the lock element to thereby lock the drawn-out operation of the webbing 90.

By the way, in either of the vehicle body acceleration sensor 32 (or 51) which has been employed in any one of the above-described respective embodiments, the sensor case 27 (or 53) including the weight 34 (or 54) is allowed to rotate in the gravity direction thereof due to its own weight, thereby being able to keep the inertia body support surface of the sensor case at a constant ground angle; and, therefore, even when the angle of the seat back is adjusted and the seat back is thereby set at different inclined positions, the present vehicle body acceleration sensor is able to fulfil its normal function. However, it should be noted here that a vehicle body acceleration sensor according to the invention is not limited to the above-mentioned structures.

Also, the above-mentioned first and second given amounts can also be detected by a method for detecting the winding diameter of the webbing, instead of the webbing winding amount detect method employed in the above-mentioned respective embodiments.

Now, in FIGS. 13 to 16, there is shown a retractor 200 for a seat belt according to a fourth embodiment of the invention, which can be used in a reclining type seat 161. In the fourth embodiment, the remaining parts of the retractor 200 except for a vehicle body acceleration sensor 132 are substantially similar in structure to those of the above-mentioned respective embodiments. Accordingly, they are given the same designations and thus the description thereof is omitted here.

The reclining type seat 161 is structured in the following manner: that is, a seat back 162 thereof is supported on a seat base portion 163 thereof in such a manner that it can be inclined back and forth about an adjusting axis extending in the width direction of the vehicle body, while the inclination angle of the seat back 162 can be adjusted according to the physiques and other conditions of the occupants.

Figure 15:
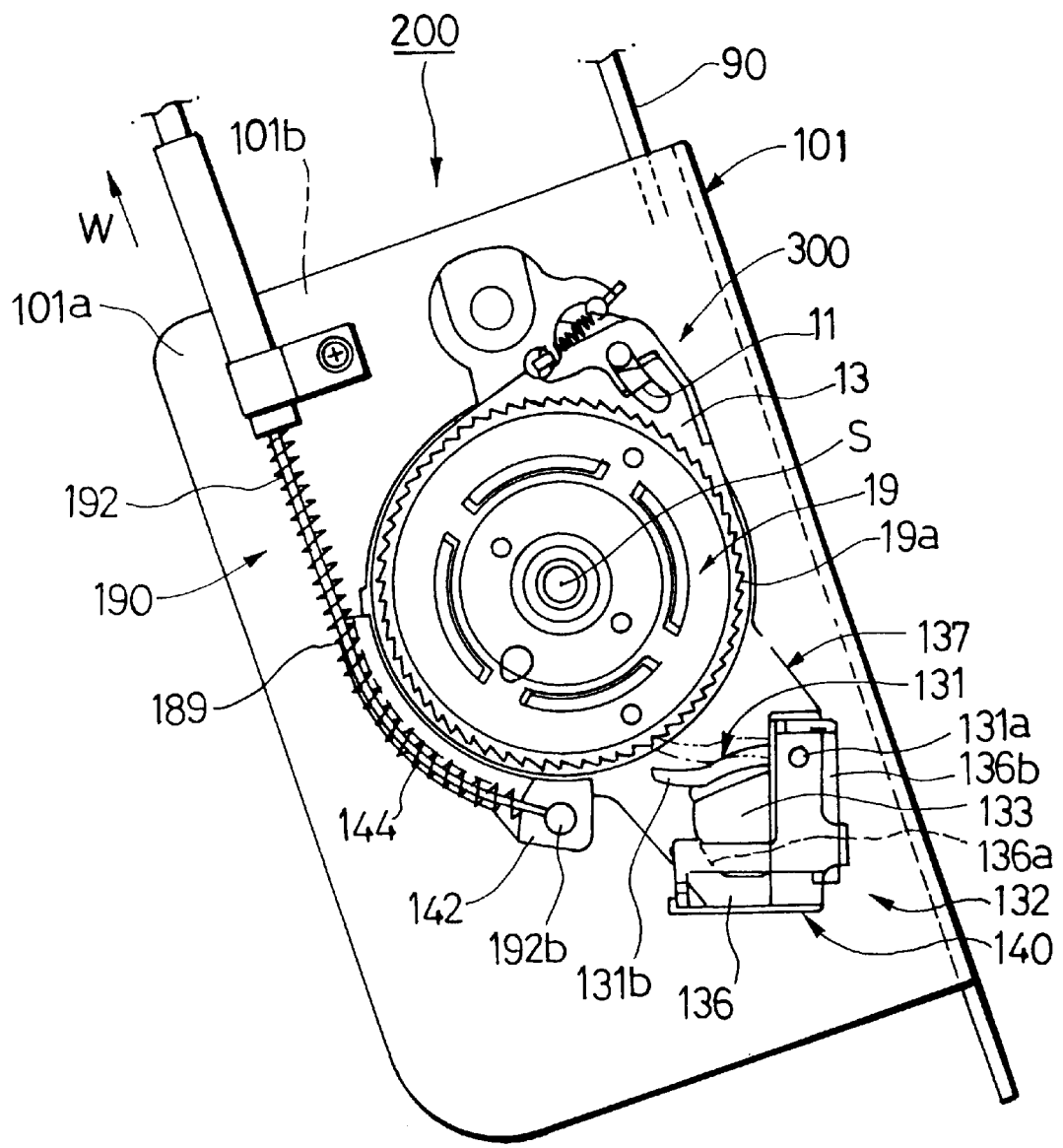
FIG. 15 is a side view of a retractor for a seat belt according to the fourth embodiment of the invention.
Figure 16:
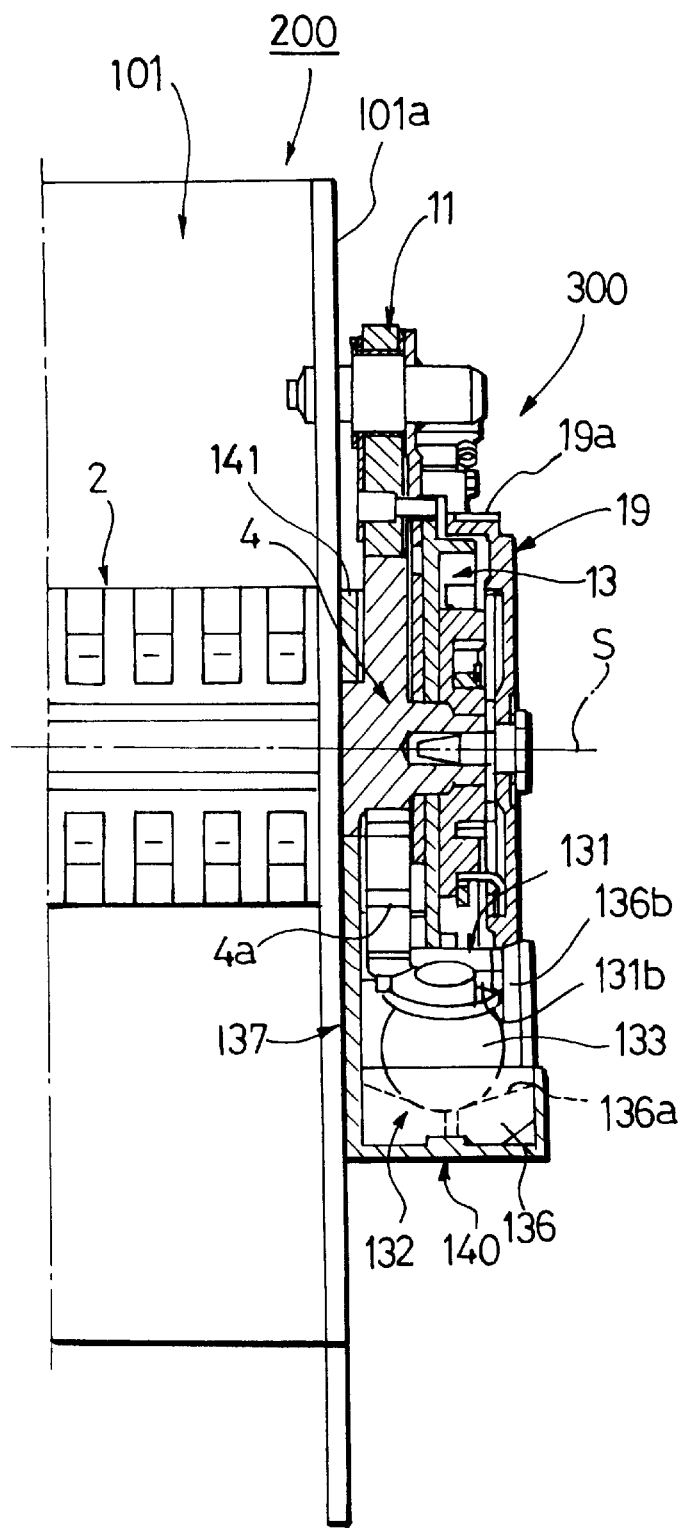
FIG. 16 is a section view of the retractor for a seat belt shown in FIG. 15.

The vehicle body acceleration sensor 132 according to the present embodiment, as shown in FIGS. 15 and 16, comprises a sensor arm 131, a sensor case 136, a ball weight 133, a case support member 137, and a transmission mechanism, 190.

In particular, the sensor case 136 includes an inertia body support surface 136a on which the ball weight 133 can be placed, and an arm support portion 136b for supporting the sensor arm 131 in a freely rotatable manner. And, the inertia body support surface 136a of the sensor case 131 has a bowl-like shape which becomes depressed toward the central portion thereof. Also, the case support member 137, as shown in FIG. 15, includes a case support portion 140 on which the sensor case 136 can be removably mounted by means of fitting, a shaft support portion 141 which extends upwardly from one side surface of the case support portion 140 and can be rotatably supported on a retractor base 101, and a connecting portion 142 which can be connected to the transmission mechanism 190 (which will be discussed later). Further, in the case support member 137, there is formed an arc-shaped winding surface 144 which continues with the connecting portion 142 and is formed concentric with the winding shaft 4.

The shaft support portion 141 of the case support member 137 is supported in such a manner that it can be rotated about the rotation axis S of the winding shaft 4. And, when the seat back 162 is inclined, the case support member 137 is rotated or operated in linking with the inclining operation of the seat back 162 by means of the transmission mechanism 190 connected to the connecting portion 142, thereby being able to adjust the sensor case 136 into a proper direction.

Referring in more particular to the sensor arm 131, as shown in FIG. 15, the shaft portion 131a of the sensor arm 131 that is located on the base end side thereof is rotatably supported on the sensor case 136 and, in a state where the sensor case 136 is mounted on the retractor 200, the sensor arm 131 can be swung about the shaft portion 131a as the rotation shaft thereof and thus can be shifted in phase from a first position up to a second position: in particular, in the first position, the leading end portion 131b of -the sensor. arm 131 is engaged with the teeth 19a of the ratchet wheel 19, so that a lock element for locking the rotation of the winding shaft 4 in the webbing drawn-out direction can be actuated; and, on the other hand, when the sensor arm 131 is set in the second position, the leading end portion 131b of the sensor arm 131 is separated from the teeth 19a, so that the lock element cannot be put into operation.

Therefore, similarly to the vehicle body acceleration sensors 32 (51) which have been respectively employed in the previously described respective embodiments, the vehicle body acceleration sensor 132 according to the fourth embodiment is also able to actuate the lock element of the emergency lock mechanism 300 to thereby lock the drawn-out operation of the webbing 90.

However, the rotation control disk 41 for the lock element detects the winding amount of the webbing 90 and, when the detected winding amount of the webbing 90 is found present between the first and second given amounts, the locking wall 41c of the rotation control disk 41 is contacted with the securing piece 15d to restrict the movement of the engaging member 15, thereby being able to prevent the engaging member 15 from moving in a direction where it can be engaged with the latch cup 13. Accordingly, also in the reclining type seat on which the retractor 200 for a seat belt is mounted, while the seat belt is stored, when the seat back is inclined forwardly or backwardly, the webbing 90 with the other end thereof fixed to the vehicle body or to the seat base portion is wound into the retract.or 200; and, in this case, even if the seat back is inclined at an angle greater than or equal to the allowed angle of the vehicle body acceleration sensor 132, the emergency lock mechanism 300 is not actuated but the webbing 90 can be drawn out from the retractor. Therefore, there is no fear that the webbing 90 can be tensed too much to raise the seat back.

Referring now to the operation of the above-mentioned transmission mechanism 190, the transmission mechanism 190 rotates the sensor case 136 about the rotation axis S thereof according to the inclination angle of the seat back 62 in order that the direction of the inertia body support surface 136a of the sensor case 136 can be kept in a proper direction (that is, in a given state facing upwardly in the vertical direction) regardless of the inclined state of the seat back 62. By the way, the present sensor case 136, which is connected to the present transmission mechanism 190, is surely prevented from rotating about the rotation axis S due to the inertia that can be produced in a vehicle collision and the like.

Referring here to the structure of the transmission mechanism 190, it comprises a winding member 180 which is mounted on the adjusting axis of the seat back 162 through a first plate 197 to be discussed later, an inner cable 192 serving as a transmission member which can be wound around the winding member 180 so that the sensor case 136 can be rotated in accordance with the inclining motion of the seat back 162, and an outer tube 194 in which the inner cable.192__is slidably stored. According to this structure, the sensor case 136 can be rotated in accordance with the inclining motion of the seat back 162 in such a manner that the rotation amount of the sensor case 136 corresponds to the winding amount of the inner cable 192 wound around the winding member 180.

Figure 13:
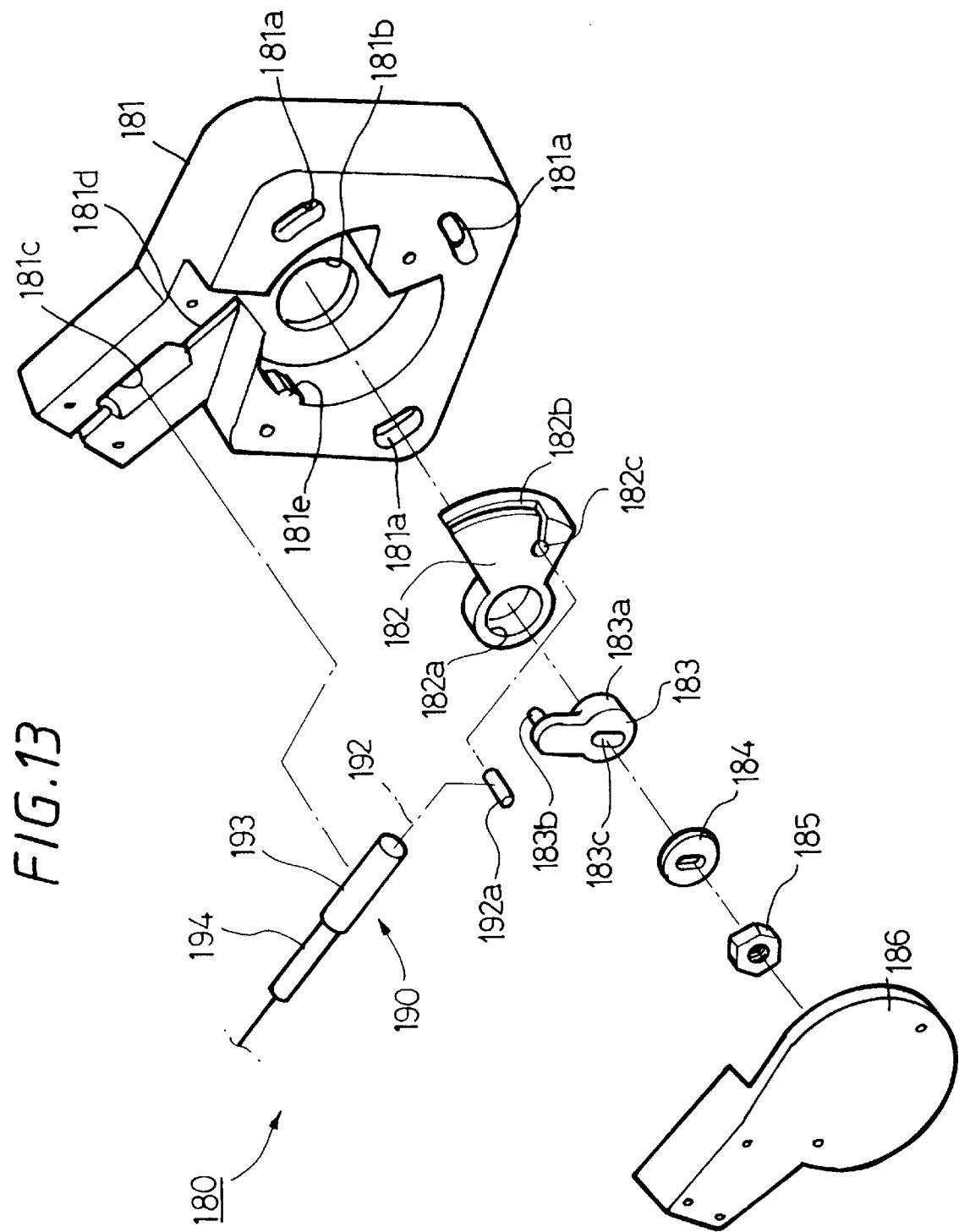
FIG. 13 is an exploded perspective view of a winding member employed in a reclining type seat according to a fourth embodiment of the invention.

Now, describing the structure of the winding member 180, as shown in FIG. 13, the winding member 180 comprises a case 181 which stores therein the end portion of the inner cable 192 on the seat base portion 163 side thereof and is to be fixed to the first plate 197 which will be discussed later, a fan-shaped slider 182 around which the inner cable 192 can be wound, a lever 183 which includes a projection portion 183b for stopping the rotation of the slider 182 and a cylindrical portion 183a serving as the rotary shaft of the slider 182, a washer 184, a nut 185 which is used to mount the lever 183 onto the first plate 197 through the washer 184, and a cover 186 to be mounted on the case 181.

The case 181 includes three mounting holes 181a forfixing the case 181 itself to the first plate 197 through bolts (not shown), a hole 181b through which the cylindrical portion 183a of the lever 183 can be inserted, a groove portion 181c into which the large diameter portion 193 of the outer tube 194 can be stored, a passage 181d which communicates with the groove portion 181c and stores therein the inner cable 192 inserted through the outer tube 194, and a projection portion 181e for stopping the rotation of the slider 182. On the other hand, the slider 182 includes a cylindrical portion 182a which can be rotatably fitted with the outer portion of the cylindrical portion 183a of the lever 183, an arc-shaped guide groove 182b around which the inner cable 192 can be wound, a hole portion 182c to which the terminal member 192a of the inner cable 192 can be fixed.

Figure 14:
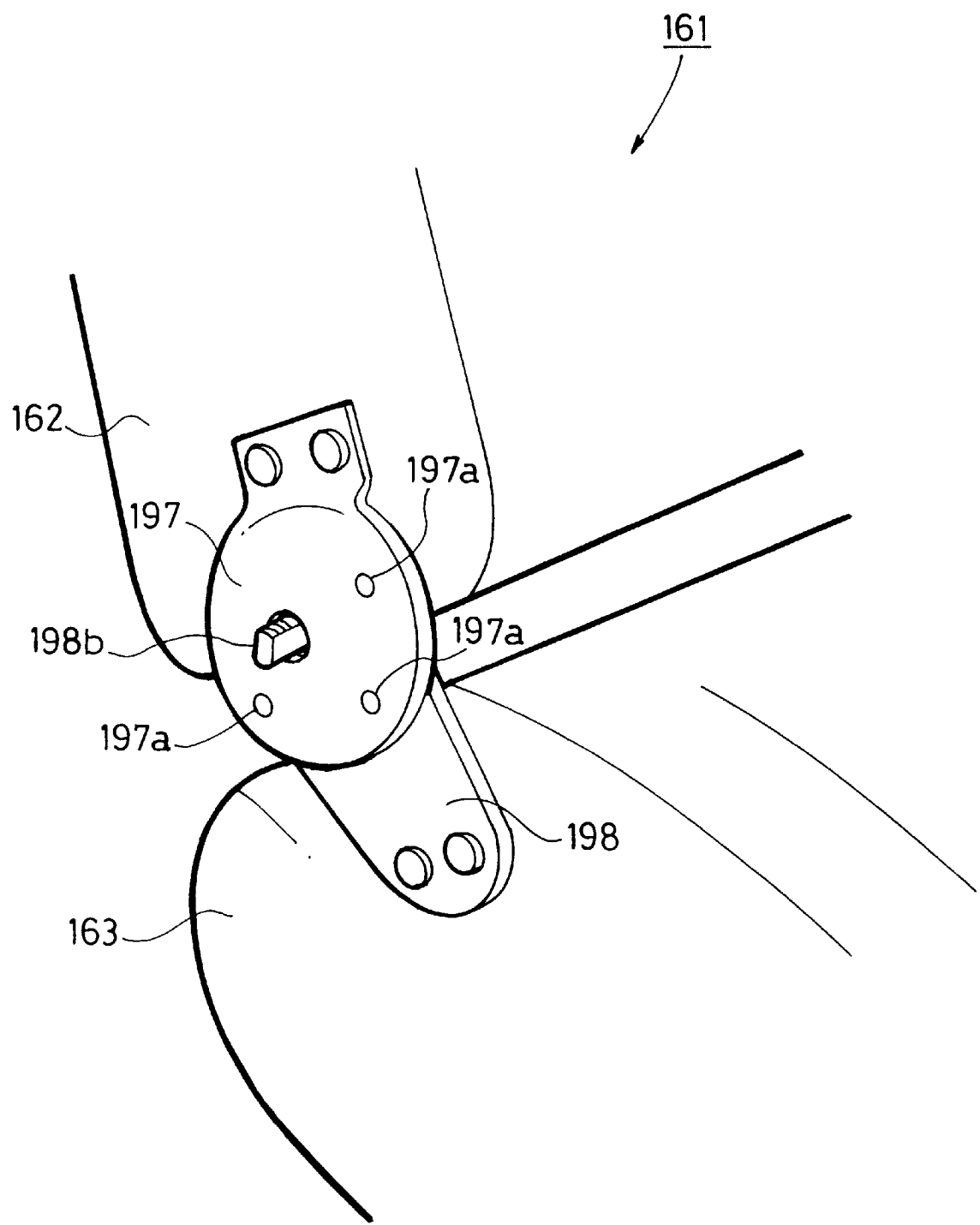
FIG. 14 is a schematic perspective view of the portion of the reclining type seat on which the winding member shown in FIG. 13 is mounted.

Now, in FIG. 14, there is shown a schematic perspective view ofa portion of a reclining type seat 161 on which the winding member 180 can be mounted. As shown in FIG. 14, the first plate 197 is fixed to the seat back 162, while a second plate 198 is fixed to the seat base portion 163. And, the case 181 of the winding member 180 is fixed to three mounting hole 197a respectively formed in the first plate 197 by bolts (not shown) through the three mounting holes 181a formed in the case 181. Also, in the second plate 198, there is provided a bolt 198b which has width across flats. And, as shown in FIG. 13, in the lever 183, there is formed a long circular hole 183c in such a manner that it corresponds to the width across flats of the bolt 198b. That is, the lever 183 can be unrotatably fixed to the bolt 198b by the nut 185.

Figure 17A:
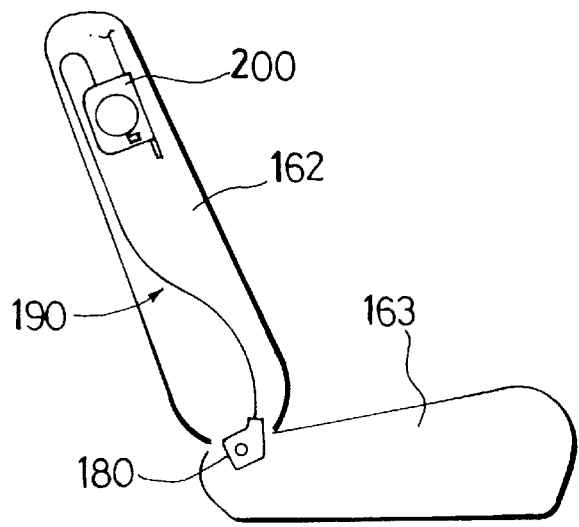
FIG. 17(a) is a side view of a seat back, showing a state thereof in which the seat back is set in its most forward position in the occupant sitting allowable range thereof.
Figure 17B:
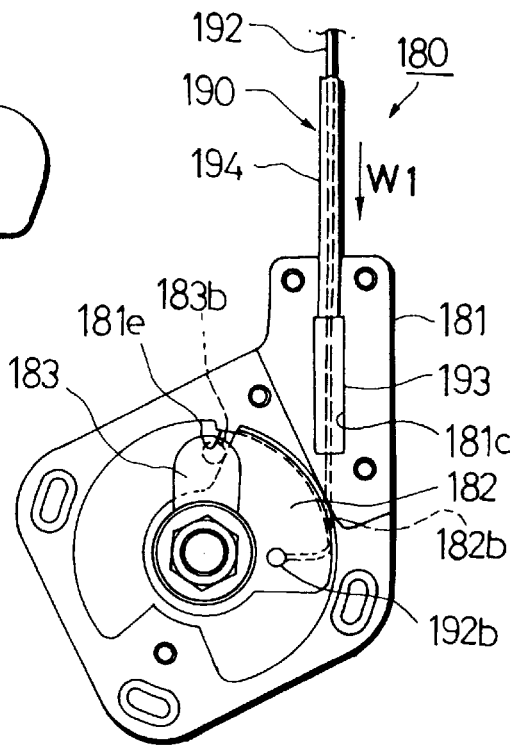
FIG. 17(b) is a side view of a winding member with a cover removed therefrom in the above seat back state.
Figure 17C:
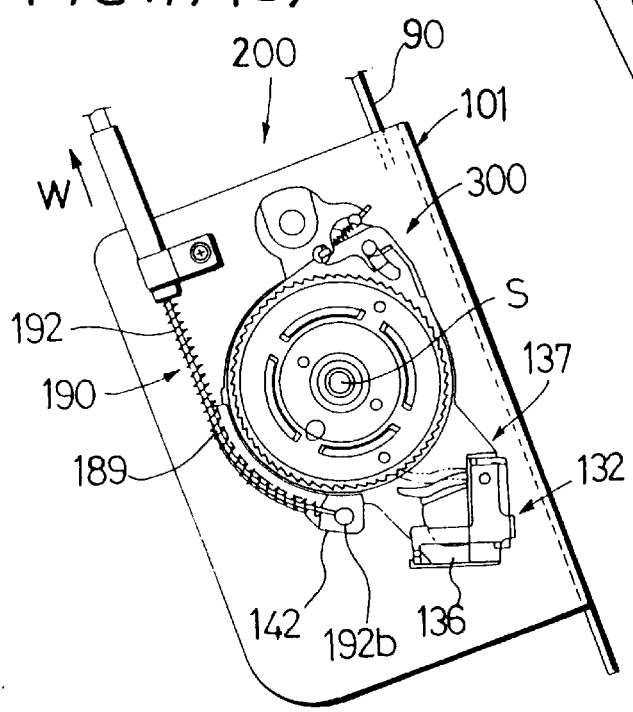
FIG. 17(c) is a side view of a retractor in the above seat back state.

Now, FIG. 17(a) shows a state in which the seat back 162 is set at the most forward position in the occupant sitting allowable range (that is, the range where an occupant is allowed to sit on the seat having the seat back 162), FIG. 17(b) shows a side view of the winding member 180 with the cover 186 removed therefrom in the seat back state shown in FIG. 17(a), and FIG. 17(c) shows a side view of the retractor 200 in the seat back state shown in FIG. 17(a).

In particular, if the seat back 162 is inclined backwardly from the state shown in FIG. 17(a) in which the seat back 162 is set at the most forward position in the occupant sitting allowable range, then the slider 182 is pulled by the inner cable 192 and is thereby going to rotate counterclockwise but, because it is held by the projection portion 183b of the lever 183, it is kept from rotating in this direction. On the other hand, the case 181 is rotated counterclockwise together with the seat back 162 as the seat back 162 is inclined. That is, due to the fact that the slider 182 and the end portion of the inner cable 192 are respectively kept from moving but the groove portion 181c of the case 181 is rotated counterclockwise, the inner cable 192 is drawn out in a direction of an arrow $W_1$ shown in FIG. 17(b) and is thereby wound around the guide groove 182b of the slider 182.

As a result of this, as shown in FIG. 17(c), the inner cable 192 is drawn out in a direction of an arrow W shown in FIG. 17(c). And, because one end portion of the inner cable 192 is connected to the vehicle body acceleration sensor 132 and the inner cable 192 is also moved along the winding surface 144 of the winding shaft 4 which is formed concentric with the winding shaft 4, the vehicle body acceleration sensor 132 is rotated-clockwise around the winding shaft 4. Since the radius of the inner cable 192 to be wound around the guide groove 182b of the slider 182 is equal to the radius of the inner cable 192 to be wound around the winding surface 144 through the spring 189, the other end of the inner cable 192 is moved by an amount equivalent to the winding length o the inner cable 192 wound around the slider 182 as the seat back 162 is inclined, with the result that the vehicle body acceleration sensor 132 is rotated by an amount equivalent to the amount of angles over which the seat back 162 is inclined.

Due to this, regardless of the inclined state of the seat back 162, the direction of the vehicle body acceleration sensor 132 can be kept properly (that is, upwardly in the vertical direction), which makes it possible to detect the acceleration of the vehicle body positively.

Figure 18A:
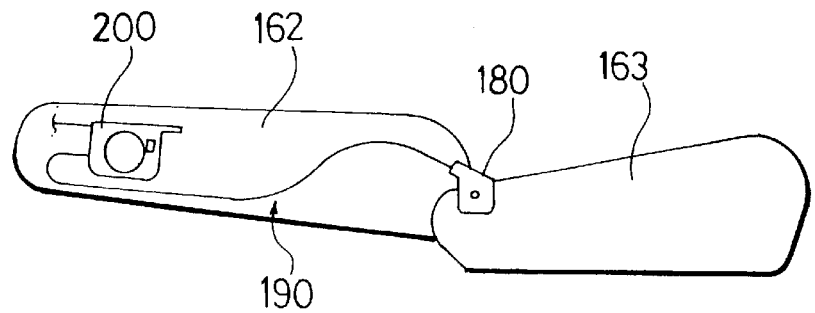
FIG. 18(a) is a side view of a seat back, showing a state thereof in which the seat back is set in its most backward position (that is, the seat back full-flat state)
Figure 18B:
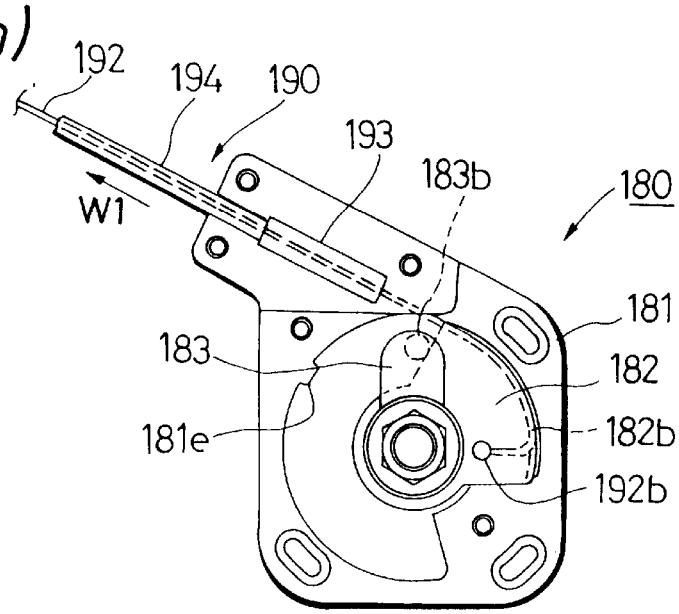
FIG. 18(b) is a side view of a winding member with a cover removed therefrom in the above seat back full-flat state.
Figure 18C:
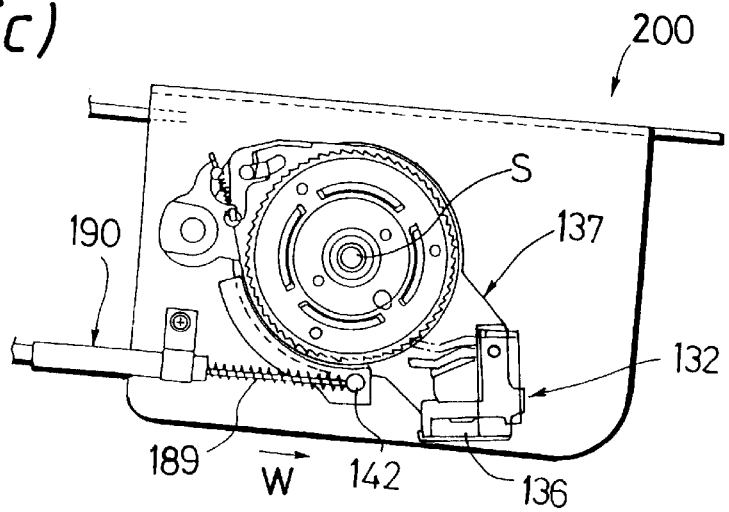
FIG. 18(c) is a side view of a retractor in the above seat back full-flat state.

Now, FIG. 18(a) shows a state (a full flat state) of the seat back 162 in which the seat back 162 is inclined most backwardly, FIG. 18(b) shows a side view of the winding member 180 with the cover 186 removed therefrom in the full flat state of the seat back 162, and FIG. 18(c) shows a side view of the retractor 200 in the full flat state of the seat back 162.

As shown in FIG. 18(b), until the full flat state of the seat back 162 is obtained, the inner cable 192 is wound around the guide groove 182b of the slider 182, and the sensor case 136, as shown in FIG. 18(c), is thereby rotated about the rotation axis S in correspondence to the winding amount of the inner cable 192 through the case support member 137. Also, in this state, the spring 189, which is wound on the sensor side end portion of the inner cable 192, is compressed.

Therefore, a counterclockwise energizing force is being applied to the vehicle body acceleration sensor 132, so that, as shown in FIG. 18(c), an energizing force having a direction of an arrow W shown in FIG. 18(c) is applied to the inner cable 192 as well. Since the inner cable 192 is connected to the slider 182, as shown in FIG. 18(b), the inner cable 192 receives a pulling force having a direction of an arrow $W_1$ shown in FIG. 18(b); but, since the inner cable 192 is also held by the projection portion 183b of the lever 183, the vehicle body acceleration sensor 132 is prevented from rotating counterclockwise any further, that is, the rotation range of the vehicle body acceleration sensor 132 is limited in this manner.

Also, if the seat back 162 is inclined forwardly from the state shown in FIG. 17 beyond the occupant sitting allowable range, then the case 181 is rotated together with the slider 182 while the projection portion 181e remains in contact with the slider 182.

Figure 19A:
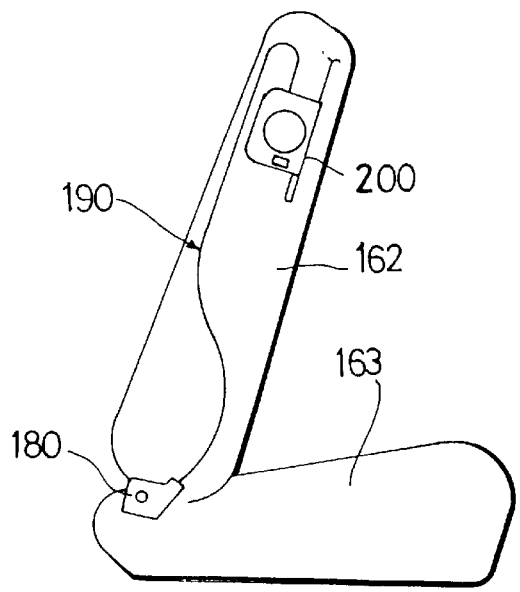
FIG. 19(a) is a side view of a seat back, showing a state thereof in which the seat back is inclined most forwardly beyond the occupant sitting allowable range thereof.
Figure 19B:
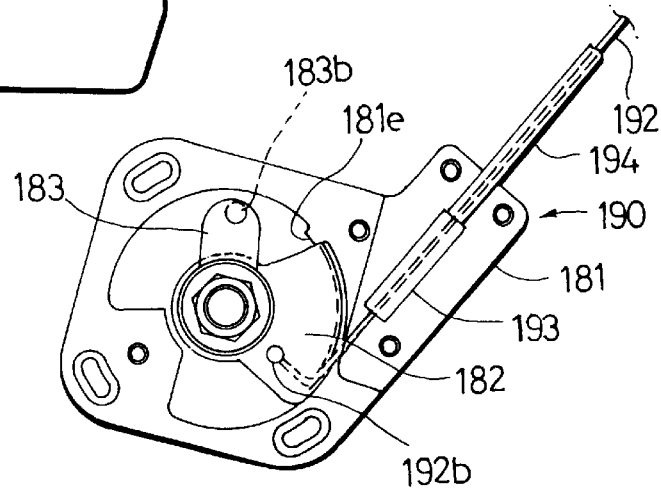
FIG. 19(b) is a side view of a winding member with a cover removed therefrom in the above seat back state.
Figure 19C:
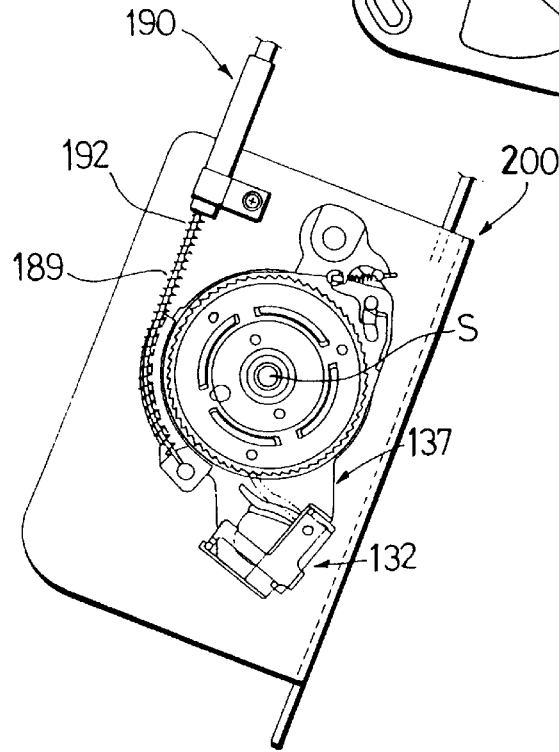
FIG. 19(c) is a side view of a retractor in the above seat back state.

Now, FIG. 19(a) shows a state of the seat back 162 in which the seat back 162 is inclined forwardly beyond the occupant sitting allowable range, FIG. 19(b) shows a side view of the winding member 180 with the cover 186 removed therefrom in the state of the seat back 162 shown in FIG. 19(a), and FIG. 19(c) shows a side view of the retractor 200 in the state of the seat back 162 shown in FIG. 19(a).

As shown in FIG. 19(b), if the seat back 162 is inclined forwardly, then the slider 182 is rotated clockwise together with the case 181 because it is in contact with the projection portion 181e of the case 181. Here, since the relative position between the slider 182 connected to the inner cable 192 and the case 181 remains unchanged, the inner cable 192 is not drawn out nor wound in.

And, due to the fact that the inner cable 192 is not drawn out nor wound in, as shown in FIG. 19(c), the relative position of the vehicle body acceleration sensor 132 with respect to the retractor 200 is also kept unchanged. Therefore, in the range where the occupant is not seated on the seat, the vehicle body acceleration sensor 132 is not rotated meaninglessly to thereby eliminate -the wasteful rotation range of the vehicle body acceleration sensor 132, so that the retractor 200 can be made compact.

Also, in the above state shown in FIG. 19(a), as described above, due to the fact that the inner cable 192 is not drawn out nor wound in, the relative position of the vehicle body acceleration sensor 132 with respect to the retractor 200 is also kept unchanged. And, in range where the occupant is not seated on the seat, due to the reclining operation of the seat back 162, the lock element of the emergency lock mechanism 300 is going to operate; but, on the other hand, the rotation control disk 41 of the lock element detects the winding amount of the webbing 90 and, in accordance with the thus detected winding amount of webbing 90, the locking wall 41c of the rotation control disk 41 is contacted with the securing piece 15d of the engaging member 15 to thereby be able to prevent the engaging member 15 from moving in a direction where it can be engaged with the latch cup 13.

As described above, also in the reclining type seat on which the retractor 200 for a seat belt is mounted, when the seat back is inclined at an angle greater than the allowed angle of the vehicle body acceleration sensor 132, the emergency lock mechanism 300 is not actuated but the webbing 90 can be drawn out from the retractor 200. Therefore, there is no possibility that the webbing 90 can be tensed too much to raise the seat back.

Now, in FIGS. 20 to 24, there is shown a retractor 400 for a seat belt according to a fifth embodiment of the invention. In the fifth embodiment, the remaining parts of the retractor 400 except for a vehicle body acceleration sensor 232 are substantially similar in structure to those of the above-mentioned respective embodiments. Accordingly, they are given the same designations and thus the description thereof is omitted here.

Figure 20:
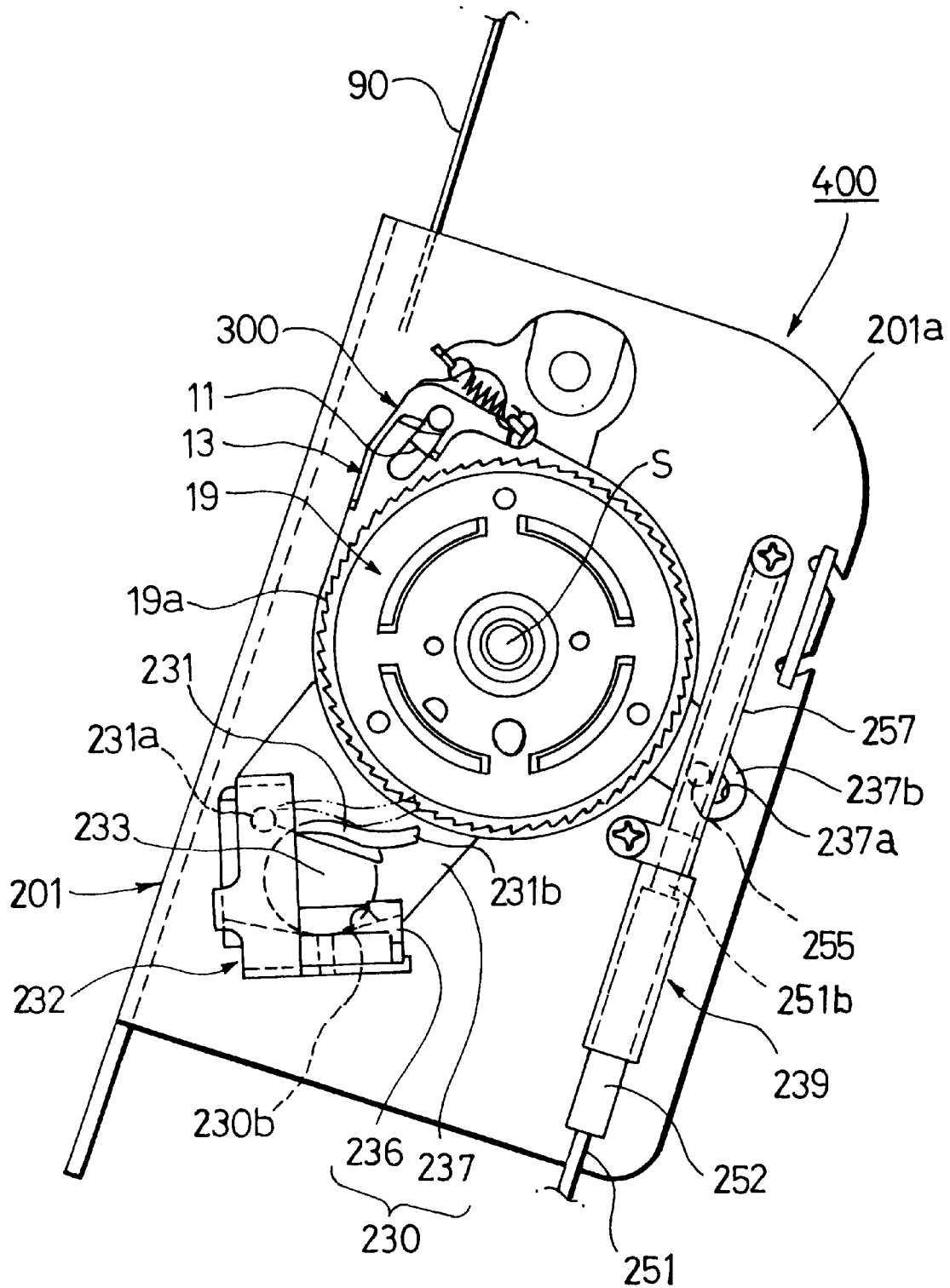
FIG. 20 is a side view of a retractor for a seat belt including a vehicle body acceleration sensor according to a fifth embodiment of the invention.
Figure 21:
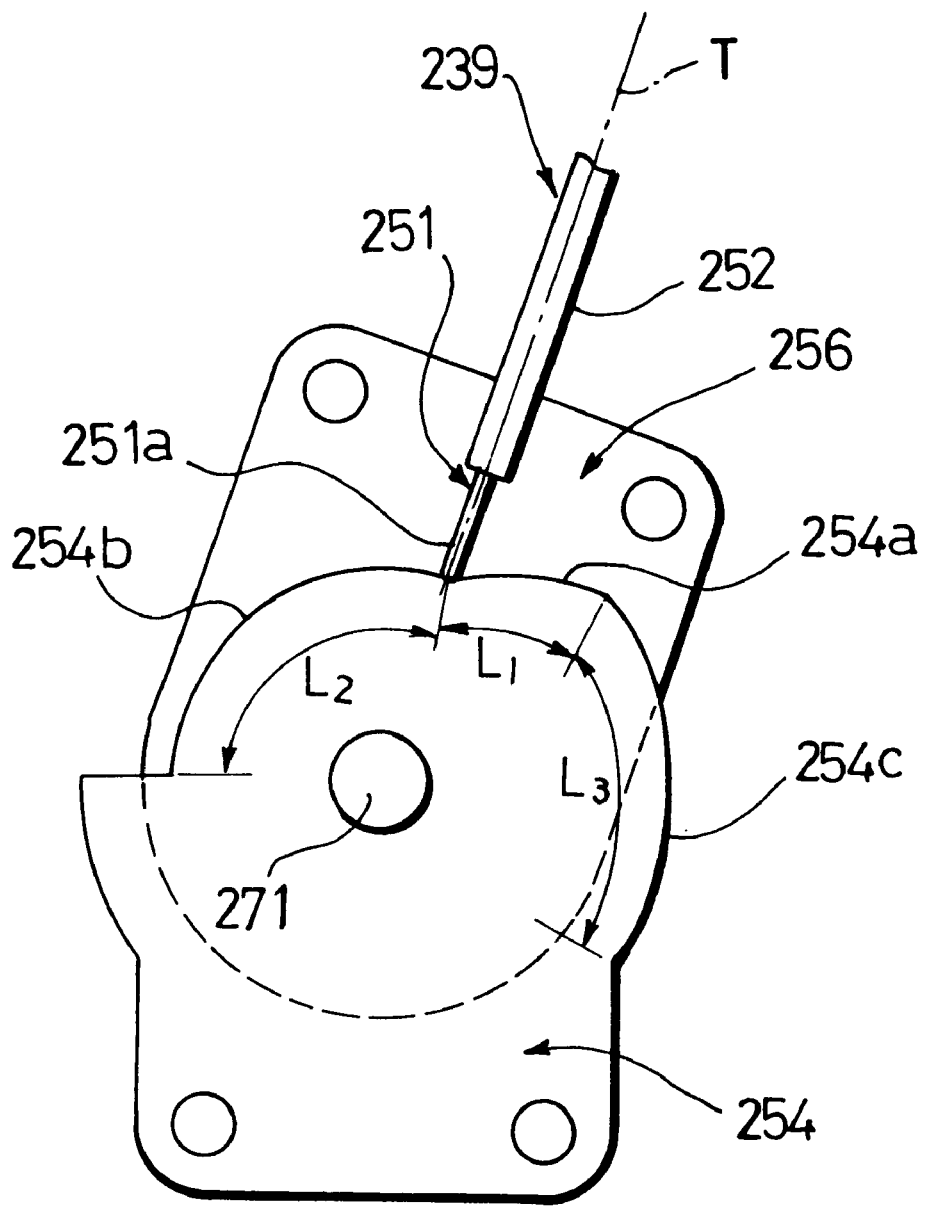
FIG. 21 is an enlarged view of the main portions of a transmission mechanism employed in the vehicle body acceleration sensor shown in FIG. 20.

The present vehicle body acceleration sensor 232, as shown in FIGS. 20 and 21, comprises a sensor arm 231, a sensor case 230, a ball weight 233 serving as an inertia body, and a transmission mechanism 239.

Here, the sensor case 230 comprises a case main body 236 having an inertia body support surface 236a on which the ball weight 233 can be placed on, and a hanger member 237 extending upwardly from one side surface of the case main body 236, while the upper end of the hanger member 237 is rotatably journaled on a bearing bush (not shown) which supports the winding shaft 4. That it, the rotation axis S of the sensor case 230 is set coincident with the rotation axis of the winding shaft 4 extending in parallel to the adjusting axis of the seat back 162.

The inertia body support surface 236a of the case main body 236 has a bowl-like shape which becomes depressed toward the central portion thereof. And, the case main body 236 is removably mounted at a given position on the hanger member 237. Also, in the ring portion of the hanger member 237, there is formed a tongue-shaped connecting portion 237b which extends outwardly in the radial direction thereof and, in the connecting portion 237b, there is formed a long hole 237a which is used as a connecting portion with respect to a transmission mechanism 239 to be discussed later.

Referring in more particular to the sensor arm 231, the shaft portion 231a of the sensor arm 231 that is located on the base end side thereof is rotatably supported on the sensor case 230 and, in a state where the sensor case 230 is mounted on the retractor 230, the sensor arm 231 can be swung about the shaft portion 231a as the rotation shaft thereof and thus can be shifted in phase from a first position up to a second position: in particular, at the first position, the leading end portion 231b of the sensor arm 231 can be engaged with the teeth 19a of the ratchet wheel 19, so that a lock element for locking the rotation of the winding shaft 4 in the webbing drawn-out direction can be actuated; and, at the second position, the leading end portion 231b of the sensor arm 231 is separated from the teeth 19a, so that the lock element is not put into operation.

Therefore, similarly to the vehicle body acceleration sensors 32 (51, 132) which have been respectively employed in the previously described respective embodiments, the vehicle body acceleration sensor 132 according to the fifth embodiment is also able to actuate the lock element of the emergency lock mechanism 300 to thereby lock the drawn-out operation of the webbing 90.

The transmission mechanism 239 rotates the sensor case 230 about the rotation axis S thereof according to the inclination angle of the seat back 62 in order that the direction of the inertia body support surface 236a of the sensor case 236 can be kept in a proper direction (that is, in a given state facing upwardly in the vertical direction) regardless of the inclined state of the seat back 62. By the way, the present sensor case 230, which is connected to the transmission mechanism 239, is surely prevented from rotating about the rotation axis S due to the inertia that can be produced and applied thereto when a vehicle collision or an emergency occurs.

The transmission mechanism 239 comprises a cam plate 254 fixed to the seat base portion 163 side and including a cam surface extending in the peripheral direction -hereof with the adjusting shaft (adjusting axis) of the seat back 162 as the center thereof, a rod member 251 serving as a transmission member which is moved following the cam surface of the cam plate 254 to cause the sensor case 230 to rotate in linking with the cam plate 254 about the rotation axis only in the rotation allowable range, and a guide cylinder 252 in which the rod member 251 is slidably stored.

By the way, instead of the rod member 251 employed in the fifth embodiment, there can also be used a flexible transmission member, that is, a wire which has not only proper flexibility but also proper rigidity. In particular, the proper flexibility is such flexibility which allows the wire to be curved to the shape of its installation portion such as the inside surface of the seat back 162 or the like. On the other hand, the proper rigidity may be as follow: that is, there is disposed a follower having one end portion thereof connected to the cam plate side end portion of the wire with the other end portion thereof connected to the sensor case in such a manner as to be able to advance toward and retreat from the cam surface of the cam plate, and, if the follower receives a force going in the longitudinal direction thereof, then the follower can slide due to the longitudinal-direction force within the guide cylinder without being buckled.

The retractor side end portion 252b of the guide cylinder 252 through which the rod member 251 can be inserted, as shown in FIG. 20, is fixed to the side plate 201a of the retractor base 201 in such a manner that the retractor side end portion 251b of the rod member 251 can pass through the periphery of the connecting portion 237b of the hanger member 237. Also, the cam plate side end portion 252a of the guide cylinder 252, as shown in FIG. 21, is positioned at and fixed to a support plate 256 fixedly mounted on the seat back 162 in such a manner that the cam prate side end portion 251a of the rod member 251 can extend toward the adjusting shaft 271 of the seat back 162 (that is, the cam plate side end portion 251a of the rod member 251 can be set on a straight line T passing through the adjusting shaft 271 of the seat back 162).

The retractor side end portion 251b of the rod member 251 is connected to the hanger member 237 through a pin 255 engaged with the long hole 237a of the connecting portion 237b, while the retractor side end portion 251b is energized toward the other end side thereof by a cooled compression spring (not shown) disposed within a guide member 257 which is mounted on the retractor side end portion 252b of the guide cylinder 252. Also, the cam plate side end portion 251a of the rod member 251 functions as a follower which moves following the cam surface of the cam plate 254 and is energized by the energizing force of the coiled compression spring disposed within the guide member 257 in such a manner that it can maintain its contact state with the cam surface of the cam plate 254.

The cam plate 254 fixed to the seat base portion 163 is structured such that its outer peripheral surface provides a cam surface which, when the seat back 162 is inclined, allows the cam plate side end portion 251a of the rod member 251 to advance and retreat along the straight line T.

The cam surface of the cam plate 254 is composed of three cam surfaces: that is, a linking cam surface 254a which is used to rotate the sensor case 230 about the rotation axis S thereof in linking with the inclined angle of the seat back 162; and, two non-linking cam surfaces 254b and 254c serving as non-linking areas which respectively continue with the linking cam surface 254a before and behind and do not link the rotation of the sensor case 230 with the inclining motion of the seat back 162.

The linking cam surface 254a controls the advancing and retreating operations of the cam plate side end portion 251a of the rod member 251 in such a manner that, when the seat back 162 is inclined within the proper use range of the retractor 400 that can restrain the occupant properly by the webbing, the direction of the inertia body support surface 236a of the case main body 236 can be maintained properly regardless of the inclined state of the seat back 162.

When the seat back 162 is inclined most forwardly within the use range of the seat belt, the cam plate side end portion 251a of the rod member 251, as shown in FIG. 21, is situated at the front end of the linking cam surface 254a. If the seat back 162 is operated and inclined backwardly from this state, then the cam plate side end portion 251a of the rod member 251 is moved integrally with the seat back 162 clockwise in FIG. 21 around the adjusting shaft 271, and the cam plate side end portion 251a is thus moved up along the linking cam surface 254a. If the rod member 251 is moved up by and along the linking cam surface 254a in this manner when the seat back 162 is inclined backwardly, then the hanger 237 with the case main body 236 mounted thereon is rotated counterclockwise in FIG. 20 with respect to the winding shaft 4, thereby being able to maintain the direction of the inertia body support surface 236a of the case main body 236 in a proper state.

Figure 22A:
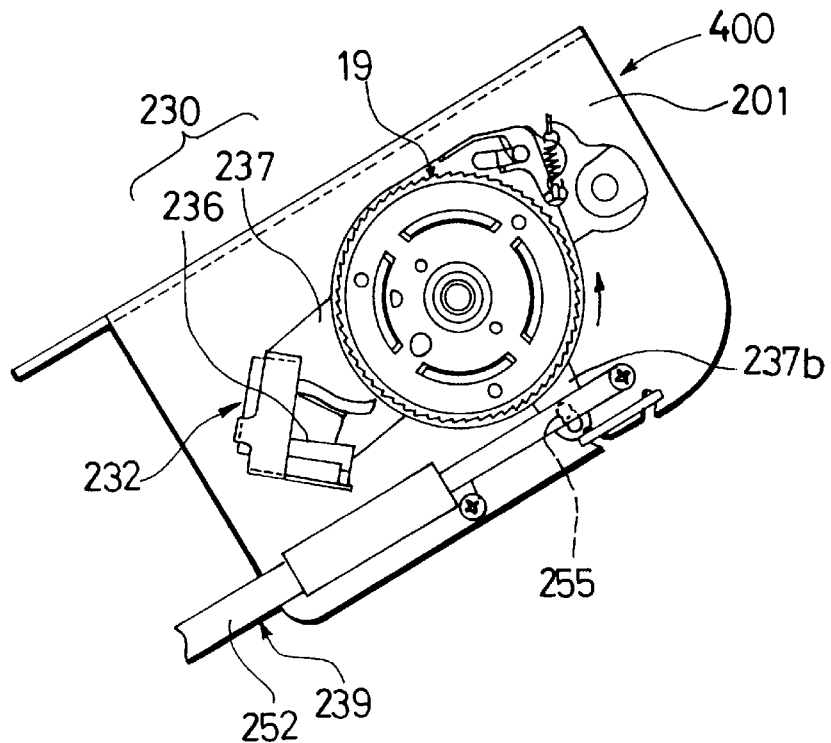
FIG. 22(a) is a side view of a retractor for a seat belt, showing the state of the vehicle body acceleration sensor when the seat back is inclined most backwardly within the seat belt use range.
Figure 22B:
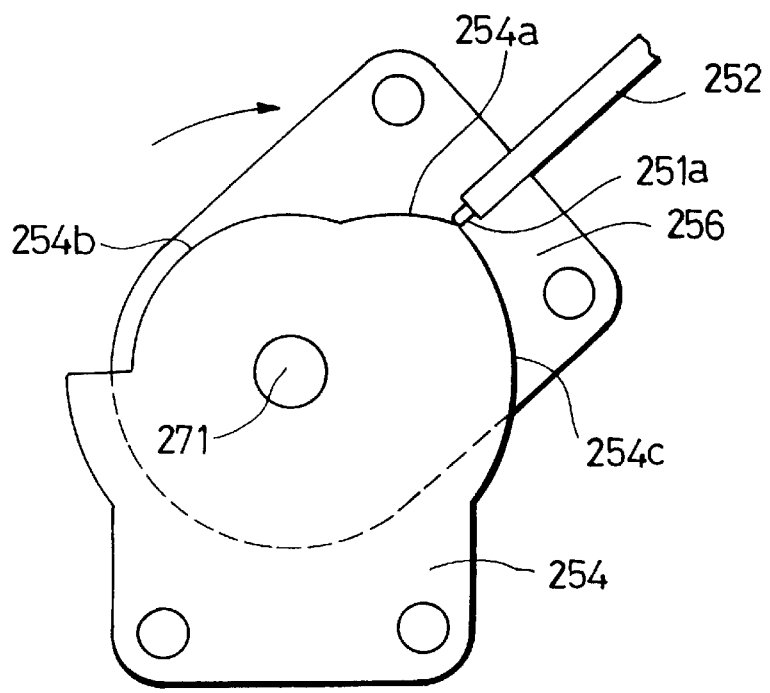
FIG. 22(b) is an enlarged view of the main portions of the transmission mechanism of the vehicle body acceleration sensor in the above state.

And, when the seat back 162 is inclined most backwardly within the use range of the seat belt, the cam plate side end portion 251a of the rod member 251, as shown in FIG. 22(b), is situated at the rear end of the linking cam surface 254a, while the hanger member 237, as shown in FIG. 22(a), maintains the direction of the inertia body support surface 236a of the case main body 236 in a proper state.

Therefore, when the inclined state of the seat back 162 is present within the range from the most forwardly inclined state to the most backwardly inclined state in the seat belt use range, the retractor 400 is able to restrict the occupant properly by the webbing 90, that is, the above-mentioned range is the proper use range of the retractor 400.

By the way, the length $L_1$ and curved state of the linking cam surface 254a, as shown in FIG. 21, are set in correspondence to the proper use range of the retractor 400; and, the range of the hanger 237, in which the hanger 237 is operated or rotated by the linking can surface 254a through the rod member 251, provides the rotation allowable range of the vehicle body acceleration sensor 232.

The above-mentioned two non-linking cam surfaces 254b and 254c respectively function as a cancel mechanism which, when the seat back 162 is inclined beyond the proper use range of the retractor 400 into a state where the occupant cannot be restricted properly by the webbing 90, limits the advancing and retreating operation of the cam plate side end portion 251a of the rod member 251 to thereby remove the linkage between the inclining motion of the seat back 162 and the rotation of the sensor case 230.

In particular, the non-linking cam surface 254b is used to limit the advancing and retreating operation of the cam plate side end portion 2Dla of the rod member 251 when the seat belt 162 is operated or inclined forwardly beyond its most forwardly inclined state within the seat belt use range. As shown in FIG. 21, the non-linking cam surface 254b is formed in such a manner as to continue with the front end of the linking cam surface 254a.

Also, the non-linking cam surface 254c is used to limit the advancing and retreating operation of the cam plate side end portion 251a of the rod member 251 when the seat belt 162 is operated or inclined backwardly beyond its most backwardly inclined state within the seat belt use range. As shown in FIG. 21, the non-linking cam surface 254b is formed in such a manner as to continue with the rear end of the linking cam surface 254a.

The two non-linking cam surfaces 254b and 254c are both arc surfaces each with the adjusting shaft 271 as a center thereof, and they keep constant the gap between the adjusting axis 271 of the seat back 262 and the cam plate side end portion 251a of the rod member 251 to thereby be able to cancel the linking operation of the hanger member 37.

Figure 23A:
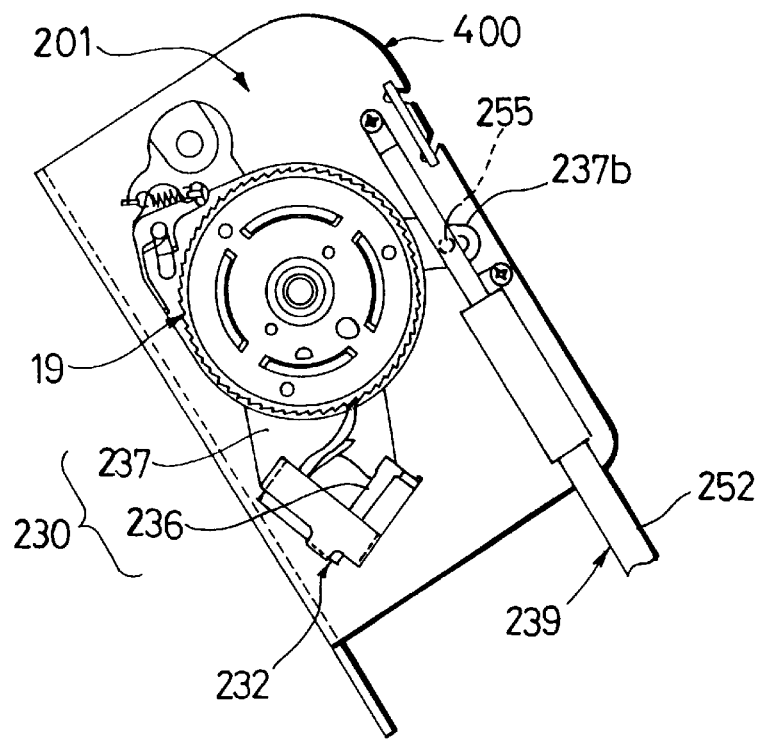
FIG. 23(a) is a side view of a retractor for a seat belt, showing the state of the vehicle body acceleration sensor when the seat back is inclined most forwardly.
Figure 23B:
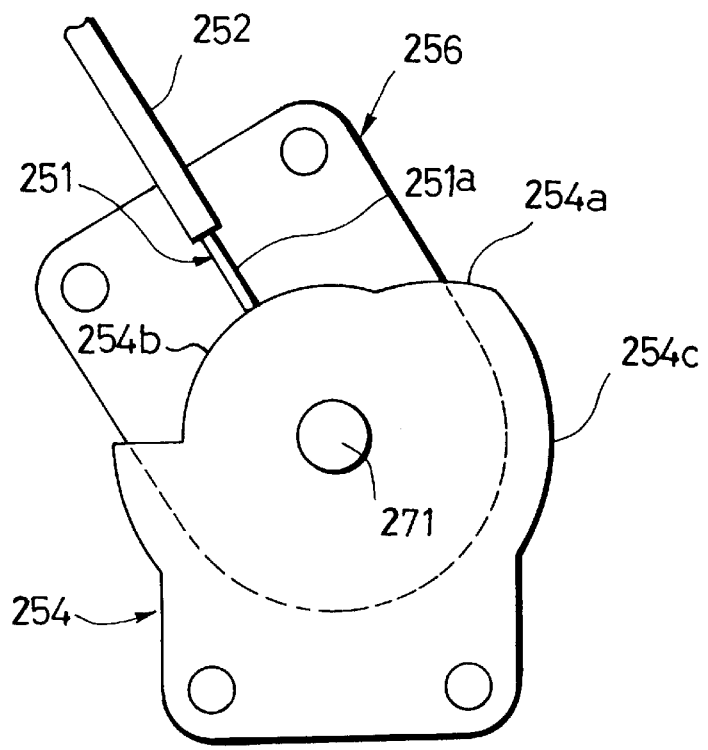
FIG. 23(b) is an enlarged view of the main portions of the transmission mechanism of the vehicle body acceleration sensor in the above state.

Now, FIG. 23 shows the rotation state of the hanger member 237 and the position of the cam plate side end portion 251a on the non-linking cam surface 254b when the seat belt 162 is operated or inclined forwardly beyond its most forwardly inclined state within the seat belt use range. In particular, even if the inclined state of the seat back 162 is changed, the rotation state of the hanger 237 is not changed but remains in the state where the cam plate side end portion 251a of the rod member 251 is in contact with the front end of the linking cam surface 254a.

Figure 24A:
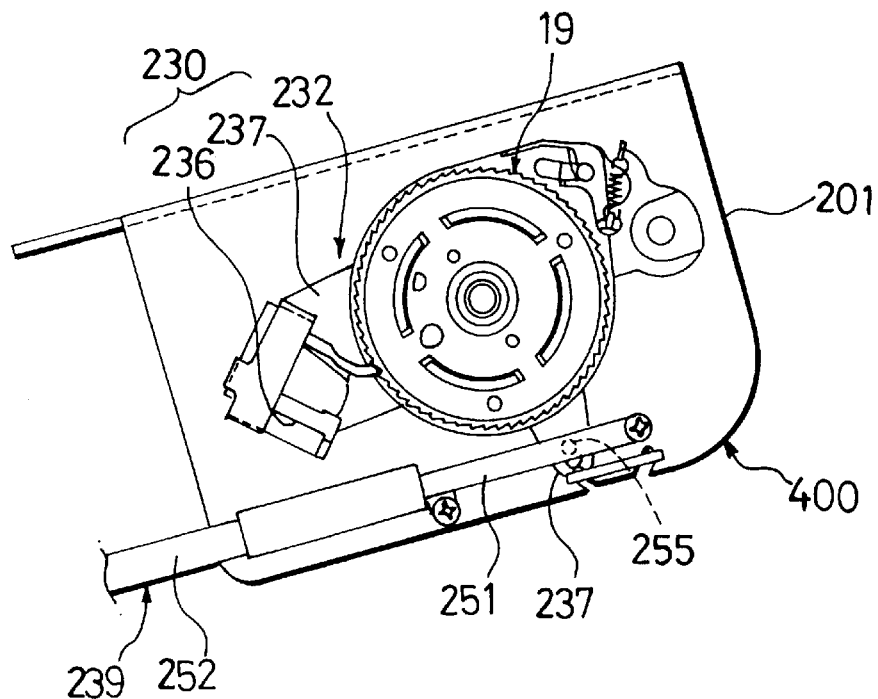
FIG. 24(a) is a side view of a retractor for a seat belt, showing the state of the vehicle body acceleration sensor when the seat back is inclined most backwardly.
Figure 24B:
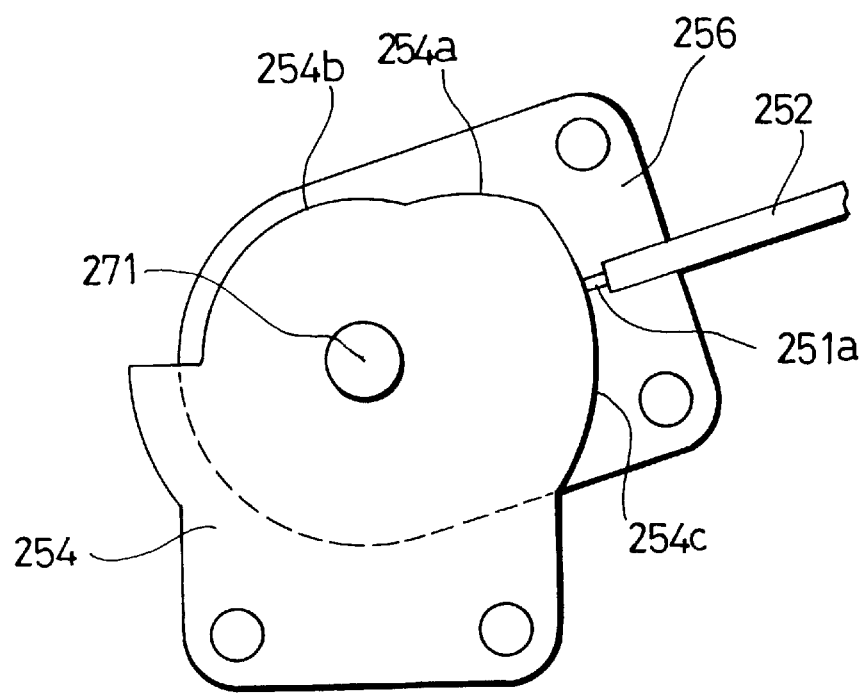
FIG. 24(b) is an enlarged view of the main portions of the transmission mechanism of the vehicle body acceleration sensor in the above state.

Now, FIG. 24 shows the rotation state of the hanger member 237 and the position of the cam plate side end portion 251a on the non-linking cam surface 254b when the seat belt 162 is operated or inclined backwardly beyond its most backwardly inclined state within the seat belt use range. In particular, even if the inclined state of the seat back 162 is changed, the rotation state of the hanger 237 is not changed but remains in the state where the cam plate side end portion 251a of the rod member 251 is in contact with the rear end of the linking cam surface 254a.

By the way, the lengths $L_2$ and $L_3$ of the two non-linking cam surfaces 254b and 254c are set in correspondence to the reclining angles required of the seat back 162.

As described above, in accordance with the vehicle body acceleration sensor 232 of the fifth embodiment of the invention, when the inclining state of the seat back 162 is changed within the retractor proper use range (that is, the rotation allowable range of the sensor case 230), the rod member 251 of the transmission mechanism 239 moves following the linking cam surface 254a to thereby rotate the sensor case 230 in linking with the inclining motion of the seat back 230, so that the direction of the inertia body support surface 236a can be maintained in a proper state.

Accordingly, even if the inclined state of the seat back 162 is changed, the sensor case 230 can be kept in a proper position and the ball weight 233 on the sensor case 230 is only the member that is moved due to an inertia force caused by shocks given in a vehicle emergency; that is, the sensitivity of the sensor is not degraded but the acceleration of the vehicle can be detected stably and positively.

Also, when the seat back 162 is inclined beyond the rotation allowable range of the sensor case 230, the rod member 251 moves following the two non-linking cam surfaces 254b and 254c to thereby remove or cancel the linked rotation of the sensor case 230 with respect to the inclining motion of the seat back 162, which eliminates an inconvenience that the inclining angle of the seat back 162 is limited to the rotation allowable range of the sensor case 230. Further, unlike the conventional retractor, according to the present embodiment, there is eliminated the need to secure a large space for movement of the sensor case 230 in order to increase the rotation allowable range of the sensor case 230 to the reclining angle of the seat back. This can prevent the retractor from becoming large in size.

Also, when the seat back 162 is inclined forwardly and backwardly beyond the proper use range, the sensor case 230 is set in the cancel state where the sensor case 230 is not linked with the inclining motion of the seat back 162 and, therefore, due to the reclining motion of the seat back 162, the lock element of the emergency lock mechanism 300 is going to operate. However, the rotation control disk 41 of the lock element detects the winding amoung of the webbing 90 and, due to the detected webbing 90 winding amount, the locking wall 41c of the rotation control disk 41 can be contacted with the securing piece 15d of the engaging member 15 to thereby prevent the engaging member 15 from moving in a direction where it can be engaged with the latch cup 13.

Thus, also in the reclining type seat on which the retractor 400 for a seat belt is mounted, when the seat back is inclined beyond the allowed angle of the vehicle body acceleration sensor 232, the emergency lock mechanism 300 is kept from being actuated and thus the webbing 90 can be drawn out from the retractor 400. Therefore, there is eliminated a fear that the webbing 90 is tensed too much to raise the seat back.

Further, the transmission mechanism 239, which moves in linking with the inclining motion of the seat back 162 to thereby maintain the direction of the inertia body support surface 236a in a proper state, is a simple mechanism: that is, it is composed of the above-mentioned rod member 251 having a simple shape, the cam plate 254 that can be mass produced simply and inexpensively by press working a plate material, and other similar simple parts, but it does not require expensive parts such as a motor and the like. Therefore, an increase in the manufacturing cost of the transmission mechanism 239 can be prevented.

And, by selecting a proper one out of cam plates having different cam profiles, the present sensor can be used in several kinds of reclining type seats as well as in retractors for seat belts, so that there can be obtained an excellent general-purpose vehicle body acceleration sensor.

By the way, the structure of the lock element of the invention is not limited to the above-mentioned embodiment but it can be properly changed within the scope of the concept of the invention. For example, instead of the latch plate forming the lock element, there can also be employed a structure in which a pawl disposed on the winding shaft can be meshingly engaged with the internal teeth of the retractor to thereby lock the rotation of the webbing in the drawn-out direction.

As has been described heretofore, according to the retractor for a seat belt of the invention, when the seat back is set within the range from the most forwardly inclined position of the seat back while the seat belt is not in use to the most backwardly inclined position of the seat back while the seat belt is not in use, the restrict mechanism for preventing the operation of the lock element prevents the lock element from performing its locking operation. Therefore, even if the seat back is inclined beyond the allowed angle of the vehicle body acceleration sensor while the seat belt is stored, there is no fear that the webbing cannot be drawn out.

Therefore, when the seat back is inclined forwardly or backwardly while the seat belt is stored, the webbing with the other end thereof fixed to the vehicle body or to the seat base portion is wound into the retractor but, even if the seat back is inclined beyond the allowed angle of the vehicle body acceleration sensor, there is no fear that the webbing can be tensed too much to raise the seat back.

While there has been described in connection with the preferred embodiment of the invention, it will be obvious to those skilled in the art that various changes and modifications may be made therein without departing from the invention, and it is aimed, therefore, to cover in the appended claim all such changes and modifications as fall within the true spirit and scope of the invention.

What is claimed is:

1. A retractor for a seat belt for use in a seat back of a reclining seat, said retractor comprising:
   a retractor base;
   a winding shaft rotatably supported on said retractor base for winding a webbing thereon;
   a Locking assembly interposed between said winding shaft and said retractor base for locking the rotation of said winding shaft in a webbing drawn-out direction thereof, wherein said locking assembly comprises:
   (A) a ratchet wheel loosely fitted with said winding shaft and having a plurality of teeth at its outer peripheral surface,
   (B) a lock member for locking the rotation of said winding shaft in a webbing drawn-out direction thereof by connecting said winding shaft to said retractor base when said ratchet wheel is rotated relative to said winding shaft, and
   (C) a friction member interposed between said lock member and said teeth of said ratchet wheel;
   a vehicle body acceleration sensor for detecting a predetermined vehicle body acceleration and for cooperating with said teeth of said ratchet wheel; and
   a restrict mechanism for preventing said locking assembly from actuating in accordance with an inclination angle of said seat back when the amount of said webbing wound around Said winding shaft is present between a first given amount corresponding to the most forwardly inclined state of said seat back and a second given amount corresponding to the most backwardly inclined state of said seat back while said seat belt is not in use.

2. A retractor for a seat belt as set forth in claim 1, wherein said restrict mechanism includes:
   a detect mechanism for detecting whether the amount of said webbing wound around said winding shaft is present or not between the first given amount corresponding to the most forwardly inclined state of said seat back and the second given amount corresponding to the most backwardly inclined state of said seat back, and
   an operation restrict portion which, when said detect mechanism detects that said webbing winding amount is present between said first and second given amounts, can be situated in an operation passage of said locking assembly to thereby prevent the operation of said locking assembly.

3. A retractor for a seat belt as set forth in claim 2, wherein said detect mechanism detects the amount of rotation of said winding shaft.

4. A retractor for a seat belt as set forth in claim wherein said detect mechanism comprises:
   a drive side gear rotatable integrally with said winding shaft and including teeth formed on the outer periphery thereof;
   a rotation control disk including teeth different in number from said teeth of said drive side gear and rotatably supported in coaxial with said drive side gear; and,
   an intermediate gear supported in such a manner as to be meshed with said teeth of said drive side gear and rotation control disk simultaneously to thereby rotate said rotation control disk following said drive side gear while shifting in phase therefrom.

5. A retractor for a seat belt as set forth in claim 4, wherein said operation restrict portion is formed on said rotation control disk.

6. A retractor for a seat belt as set forth in claim 4, wherein said drive side gear and said rotation control disk are coaxially disposed with the center axis of said winding shaft.

7. A retractor for a seat belt as set forth in claim 4, wherein said intermediate gear is supported on said retractor base.

8. A retractor for a seat belt as set forth in claim 1, wherein said lock member comprises:
   a pawl capable of moving between a first position in which said pawl connects said winding shaft to said retractor base and a second position in which said pawl disconnects said winding shaft from said retractor base;
   a latch member for operating said pawl; and
   an engagement lock element for connecting said latch member with said winding shaft when said ratchet wheel is rotated relative to said winding shaft.

9. A retractor for a seat belt as set forth in claim 8, wherein said restrict mechanism prevents said engagement lock element from connecting said winding shaft to said latch member.

10. A retractor for a seat belt as set forth in claim 1, wherein said vehicle body acceleration sensor includes an arm member which can be engaged with said ratchet wheel when said vehicle body acceleration sensor is actuated.

11. A retractor for a seat belt as set forth in claim 10, wherein said vehicle body acceleration sensor includes a ball weight for actuating said arm member.

12. . A retractor for a seat belt for use in a seat back of a reclining seat, the retractor comprising:
   a retractor base;
   a winding shaft rotatably supported on the retractor base for winding a webbing thereon;
   a locking assembly interposed between the winding shaft and the retractor base for locking the rotation of the winding shaft in a webbing drawn-out direction thereof;
   a vehicle body acceleration sensor for detecting a predetermined vehicle body acceleration to thereby actuate the locking assembly; and
   a restrict mechanism for preventing said locking assembly from actuating in accordance with an inclination angle of said seat back when the amount of said webbing wound around said winding shaft is present between a first given amount corresponding to the most forwardly inclined state of said seat back and a second given amount corresponding to the most backwardly inclined state of said seat back while said seat belt is not in use, wherein said restrict mechanism includes:

a detect mechanism for detecting whether the amount of said webbing wound around said winding shaft is present or not between a first given amount corresponding to the most forwardly inclined state of said seat back and a second given amount corresponding to the most backwardly inclined state of said seat back, and an operation restrict portion which, when said detect mechanism detects that said webbing winding amount is present between said first and second given amounts, can be situated in an operation passage of said locking assembly to thereby prevent the operation of said locking assembly.

13. A retractor for a seat belt as set forth in to claim 12, wherein said detect mechanism detects the amount of rotation of said winding shaft.

14. A retractor for a seat belt as set forth in claim 13, wherein said detect mechanism comprises:

a drive side gear rotatable integrally with said winding shaft and including teeth formed on the outer periphery thereof;

a rotation control disk including teeth different in number from said teeth of said drive side gear and coaxially rotatably supported with said drive side gear; and an intermediate gear supported in such a manner as to be meshed with said teeth of said drive side gear and rotation control disk simultaneously to thereby rotate said rotation control disk following said drive side gear while shifting in phase therefrom.

15. A retractor for a seat belt as set forth in claim 14, wherein said operation restrict portion is formed on said rotation control disk.

16. A retractor for a seat belt as set forth in claim 14, wherein said drive side gear and said rotation control disk are coaxially disposed with the center axis of said winding shaft.

17. A retractor for a seat belt as set forth in claim 14, wherein said intermediate gear is supported on said retractor base.

18. A retractor for a seat belt as set forth in claim 12, wherein said locking assembly comprises:

(a) a ratchet wheel loosely fitted with said winding shaft and having a plurality of teeth at its outer peripheral surface;

(b) a lock member for locking the rotation of said winding shaft in a webbing drawn-out direction thereof by connecting said winding shaft to said retractor base when said ratchet wheel is rotated relative to said winding shaft; and (c) a friction member interposed between said lock member and said teeth of said ratchet wheel.

19. A retractor for a seat belt as set forth in claim 18, wherein said lock member comprises:

a pawl capable of moving between a first position in which said pawl connects said winding shaft to said retractor base and a second position in which said pawl disconnects said winding shaft to said retractor base;

a latch member for operating said pawl; and an engagement lock element for connecting said latch member with said winding shaft when said ratchet wheel and said winding shaft are rotated relatively.

20. A retractor for a seat belt as set forth in claim 19, wherein said restrict mechanism prevents said engagement lock from connecting said winding shaft to said latch member.

21. A retractor for a seat belt as set forth in claim 18, wherein said vehicle body acceleration sensor includes an arm member which can be engaged with said teeth of said ratchet wheel when said vehicle body acceleration sensor is actuated.

22. A retractor for a seat belt as set forth in claim 21, wherein said vehicle body acceleration sensor includes a ball weight for actuating said arm member.

* * * * *